US010743079B2

(12) United States Patent
Sen et al.

(10) Patent No.: US 10,743,079 B2
(45) Date of Patent: Aug. 11, 2020

(54) SYSTEMS AND METHODS FOR PROVIDING SUBTITLES BASED ON LANGUAGE PROFICIENCY

(71) Applicant: Rovi Guides, Inc., San Jose, CA (US)

(72) Inventors: Susanto Sen, Karnataka (IN); Amit Roy Choudhary, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/222,634

(22) Filed: Dec. 17, 2018

(65) Prior Publication Data

US 2020/0196022 A1    Jun. 18, 2020

(51) Int. Cl.
*H04N 21/488* (2011.01)
*H04N 21/485* (2011.01)
*H04N 21/45* (2011.01)
*G06F 40/247* (2020.01)

(52) U.S. Cl.
CPC ....... *H04N 21/4856* (2013.01); *G06F 40/247* (2020.01); *H04N 21/4532* (2013.01); *H04N 21/4884* (2013.01)

(58) Field of Classification Search
CPC ................................................. H04N 21/4884
See application file for complete search history.

(56) References Cited

U.S. PATENT DOCUMENTS

| 6,279,018 B1 | 8/2001 | Kudrolli et al. |
| 2009/0073314 A1 | 3/2009 | Uemukai et al. |
| 2009/0087822 A1 | 4/2009 | Stanton et al. |
| 2010/0159425 A1* | 6/2010 | Hamlin ............. G09B 5/06 434/169 |
| 2011/0164175 A1 | 7/2011 | Chung et al. |
| 2013/0173034 A1 | 7/2013 | Reimann et al. |
| 2013/0196292 A1* | 8/2013 | Brennen ............. G09B 19/06 434/157 |
| 2014/0150009 A1* | 5/2014 | Sharma ............. H04N 21/4126 725/28 |
| 2018/0211556 A1 | 7/2018 | Sreedhara |

OTHER PUBLICATIONS

Sokoli, "Learning via Subtitling (LvS): A tool for the creation of foreign language learning activities based on film subtitling," EU-High-Level Scientific Conference Series, *Mutra 2006—Audiovisual Translation Scenarios: Conference Proceedings*, 8 pages.

* cited by examiner

*Primary Examiner* — Michael H Hong

(74) *Attorney, Agent, or Firm* — Haley Guiliano LLP

(57) ABSTRACT

Systems and methods are described for providing subtitles based on a user's language proficiency. An illustrative method includes receiving a request to display subtitles, selecting a language for the subtitles, determining, from a user profile, a user's proficiency level in the selected language, selecting, based on the user's proficiency level in the selected language, a set of subtitles from a plurality of sets of subtitles in the selected language, wherein each respective set of subtitles corresponds to a different proficiency level in the selected language, and generating for display the selected set of subtitles.

24 Claims, 16 Drawing Sheets

214⌐                                                              200

| Subtitles: | | |
|---|---|---|
| <u>Language</u> | <u>Proficiency Level</u> | <u>Word</u> |
| English | Beginner | That |
| | | is |
| | | a |
| | | with |
| | | pretty |
| | | lamp |
| | | golden |
| | Intermediate | beautiful |
| | Fluent | paraffin |
| | | adorned |
| | | decoration |
| French | Beginner | Cette |
| | | lampe |
| | | est |
| | | d'une |
| | | à |
| | | jolie |
| | Intermediate | dorée |
| | | magnifique |
| | Fluent | paraffine |
| | | ornée |
| | | décoration |

FIG. 2B

SYSTEMS AND METHODS FOR PROVIDING SUBTITLES BASED ON LANGUAGE PROFICIENCY

BACKGROUND

The present disclosure relates to providing subtitles based on language proficiency, and more particularly, to methods and systems for selecting or modifying subtitles based on a user's language proficiency.

SUMMARY

Media devices may be configured to display subtitles for media assets. Subtitles for a given media asset are frequently generated in multiple languages in order to improve the viewing experience of viewers who may not understand the language of audio content (e.g., dialogue) of the media asset. By displaying the subtitles, the media devices enable such viewers to read the subtitles and thereby follow along with the dialogue included in the media asset. The desire for subtitles is particularly strong among viewers who are completely unfamiliar with the language of the dialogue of the media asset and thus require subtitles in a different language to understand the dialogue. Such viewers may wish to select subtitles in their native language. However, conventional subtitle generation systems often do not generate subtitles for a given media asset in every language, which may require viewers to select a subtitle language that is not their native language. Further, the single set of subtitles generated in each language by conventional subtitle generation systems often requires the viewers to be fluent in the language of the subtitles in order to understand the subtitles. For example, a viewer may wish to watch a media asset with English audio, but the viewer is fluent only in Italian, and also understands some French. The media asset may have subtitles available only in French and German, thus requiring the viewer to select subtitles in a language (French) in which the viewer is not fluent. In another example, a viewer may be learning a language but may not yet be fluent in the language. The viewer may therefore wish to display subtitles either in the language of the audio content or in a different language to follow along with the dialogue of the media asset. In each of these examples, while the viewer may be able to understand some of the subtitles, the viewer's experience of the media asset will be negatively impacted by the viewer's lack of understanding of some of the dialogue corresponding to subtitles that the user may not understand. There exists, therefore, a need to improve the viewing experience for viewers who view subtitles for media assets in a language in which the viewers are not fluent.

Accordingly, to overcome such problems, methods and systems are described herein for providing subtitles based on a viewer's language proficiency. In particular, the embodiments described herein provide for selecting or modifying subtitles to tailor the subtitles to the viewer's proficiency in the language of the subtitles. In some embodiments, multiple sets of subtitles are generated in each of a plurality of languages, with subtitles of varying levels of complexity (and thus designed for viewers with different levels of proficiency in the language) for each language. The methods and systems select, from among the multiple sets of subtitles for each language, a set of subtitles matching the viewer's proficiency in a selected language. In other embodiments, the methods and systems modify (such as by replacing words or phrases with synonyms matching the viewer's proficiency in the language) the subtitles to suit the viewer's proficiency in the selected language. This greatly improves the viewing experience of the viewers of the media content by allowing the viewers to follow along with the dialogue of the media asset even if the viewers are not fluent in the language of the subtitles.

In one illustrative embodiment, a system receives a request to display subtitles. The system selects a language for the subtitles, and determines, from a user profile, a user's proficiency in the selected language. The system then selects, based on the user's proficiency in the selected language, a set of subtitles from a plurality of previously generated sets of subtitles in the selected language. Each respective set of subtitles is stored in a database and corresponds to a different proficiency level in the selected language. The system then generates for display the selected set of subtitles. For example, the system receives a request to display French subtitles for a media asset. The system then selects "French" as the language for the subtitles, and determines from a user profile that the user is only moderately proficient in French. French subtitles for the media may be available in "beginner," "intermediate," and "fluent" proficiency levels. Based on the user's moderate proficiency in French, the system selects the intermediate-level subtitles and generates for display the selected subtitles.

In another illustrative embodiment, a system determines, from an electronically stored user profile, a language proficiency level. The system then identifies a word in a subtitle with an assigned language proficiency level that is higher than the determined language proficiency level and replaces the identified word with a synonym that has an assigned language proficiency level that is not higher than the determined language proficiency level. The system then generates for display the subtitle having the synonym instead of the identified word. For example, the system receives a request to display French subtitles for a media asset. The system determines that the user is only moderately proficient in French based on a user profile. The system then identifies a word, in subtitles for the media asset, that has an assigned proficiency level above moderate (e.g., a word that is assigned a "fluent" proficiency level), and replaces the word with a synonym that does not have an assigned proficiency level above moderate (e.g., a synonym that is assigned a "beginner" or "intermediate" proficiency level), and generates for display the subtitles with the word with the fluent proficiency level replaced by the synonym with the beginner or intermediate proficiency level.

In some embodiments, the system may not be able to find a set of subtitles matching the user's proficiency level in the selected language and may instead select a set of subtitles in the selected language and modify the selected set of subtitles based on the user's proficiency level in the selected language. For example, the user may have a beginner proficiency level in French, but the only subtitles available for a given media asset are assigned a "fluent" proficiency level. The system may then identify, in the fluent level subtitles, words that are assigned a proficiency level above "beginner," and may replace such words with synonyms that are assigned a beginner proficiency level.

In some embodiments, in addition to replacing individual words, the system may replace entire phrases or sentences with alternate words, phrases, or sentences that match the user's proficiency level. In still further embodiments, the system may omit words or phrases for which synonyms or alternate words or phrases matching the user's proficiency level are not available.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2B shows an illustrative database table of proficiency levels assigned to words of a subtitle, in accordance with some embodiments of the disclosure;

DETAILED DESCRIPTION

Figure 1:
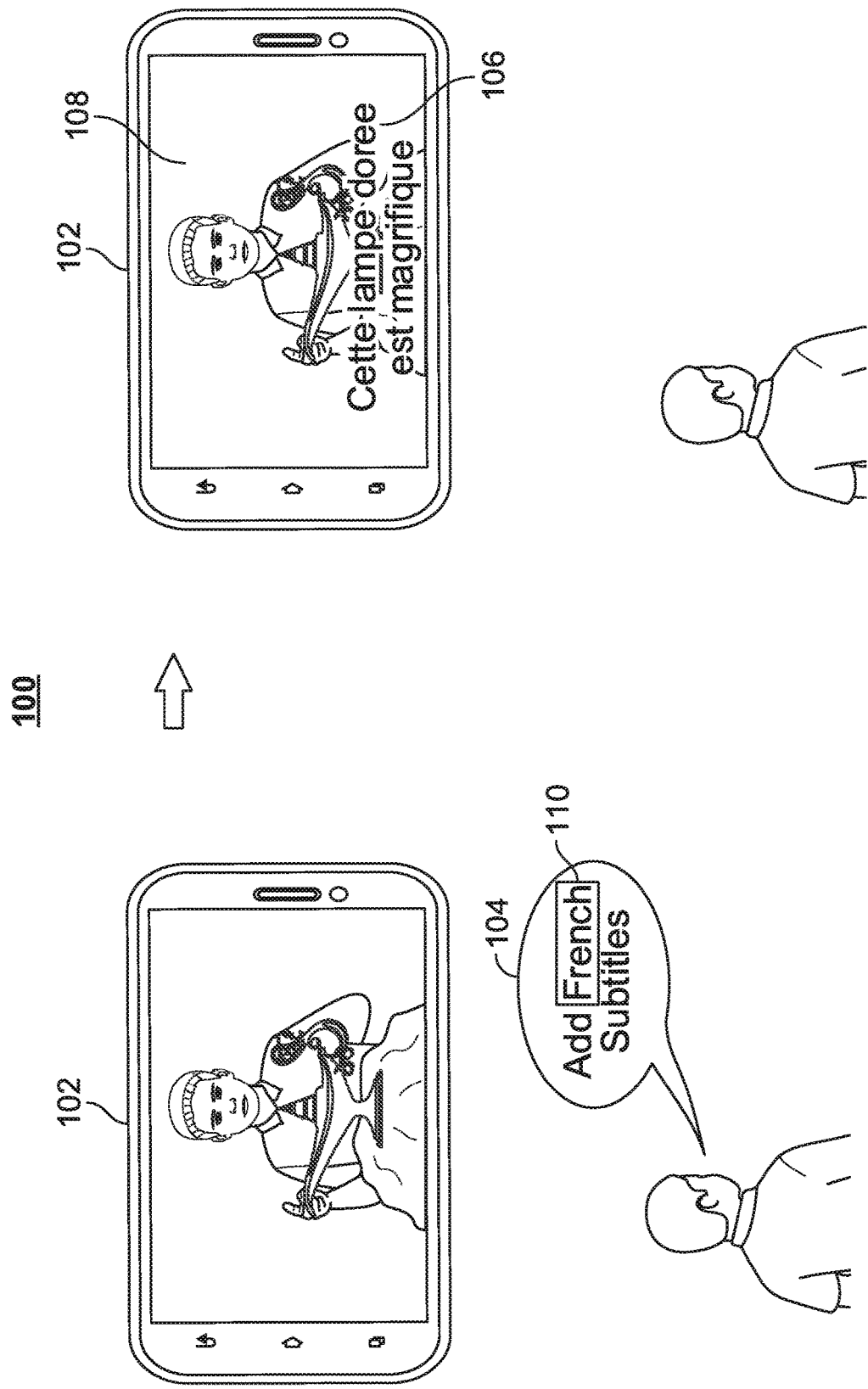
FIG. 1 shows an illustrative scenario for providing subtitles based on a user's language proficiency, in accordance with some embodiments of the disclosure.

FIG. 1 shows an illustrative scenario 100 for providing subtitles based on a user's language proficiency. In FIG. 1, a media device 102 receives a request 104 for subtitles 106 from a user. The media device 102 may be any device configured to retrieve and/or generate for display subtitles 106 for a media asset 108, such as a smart television, a set-top box, an integrated receiver decoder (IRD) for handling satellite television, a digital media receiver (DMR), a streaming media device, a personal computer (PC), a laptop computer, a tablet computer, a WebTV box, a personal computer television (PC/TV), a handheld computer, a personal digital assistant (PDA), a smartphone, a wearable computer, an augmented and/or virtual reality display device, and/or any other computing equipment configured to provide subtitles 106 for a media asset 108 or execute an application configured to provide subtitles 106 for a media asset 108. In some embodiments, the media device 102 also retrieves and/or outputs the media asset 108, while in other embodiments a separate media device (not shown in FIG. 1) may be used to retrieve and/or output the media asset 108.

The request 104 for subtitles includes a reference to a language 110. For example, the request 104 may be a natural language voice prompt spoken by a user and detected as input by the media device 102. The media device 102 then processes the voice prompt (such as via digital signal processing, audio template matching, etc.) to identify the words included in the voice prompt and identifies the reference to the language 110 based on the words included in the voice prompt (e.g., via keyword matching). In some embodiments, the request 104 is textual input and/or a selection (such as via voice, touch, or another user input device) of a predetermined option. While FIG. 1 shows the request 104 being received directly from a user, those skilled in the art will appreciate that the request 104 may be received by and relayed via one or more intermediary devices, such as a passive-listening device, a remote control associated with the media device 102, etc.

In response to receiving the request 104 and identifying the language reference 110, the media device 102 determines the user's proficiency level in the language 110 and retrieves or generates subtitles 106 corresponding to the determined language proficiency level, as further described below with reference to FIGS. 4-16. The media device 102 then generates for display the subtitles 106.

Figure 2A:
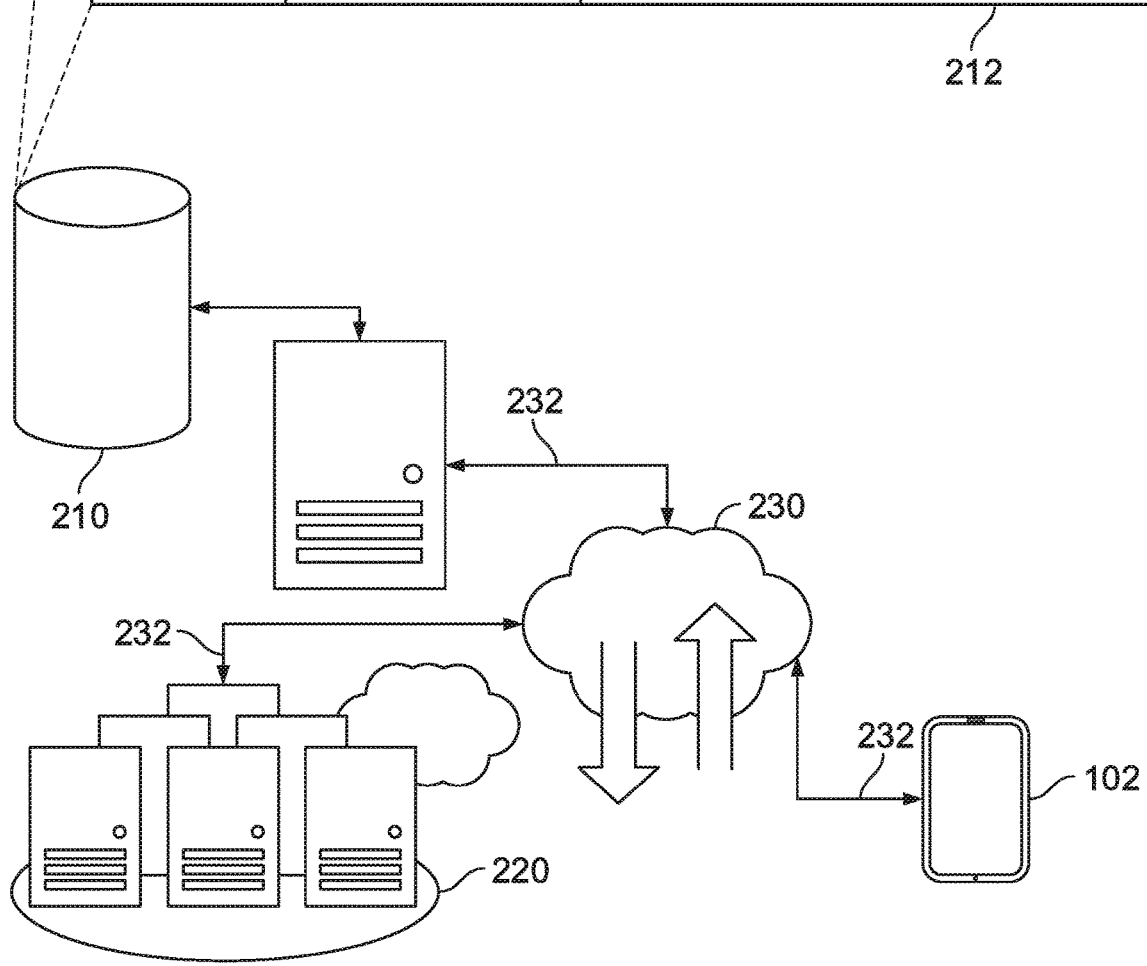
FIG. 2A shows an illustrative system for providing subtitles based on a user's language proficiency, in accordance with some embodiments of the disclosure.

FIG. 2A shows an illustrative system for providing subtitles based on a user's language proficiency. In particular, FIG. 2A shows a system 200 where the media device 102 retrieves subtitles 106 corresponding to the user's proficiency level in the language 110 from a content source 210 via a communications path 232. The content source 210 may be any server, broadcasting, or transmission equipment by means of which a content provider provides subtitles and/or related metadata associated with a media asset 108, either in addition to or separate from the media asset 108, to the media device 102. In that regard, the communications path 232 may be any network or communication equipment or medium by means of which the media device 102 can communicate (e.g., submit a query to and/or retrieve data or content from) the content source 210. In one illustrative example, the communications path 232 includes devices connected via the Internet.

A subtitle generation application may be implemented on any one or a combination of the media device 102, the content source 210, and/or an application server 220, each of which may function as a stand-alone device or may be part of a network of devices. Various network configurations of devices may be implemented and are discussed in more detail below. In the system 200, there may be multiple media devices 102, but only one is shown in FIG. 2 to avoid overcomplicating the drawing. In addition, multiple users may each utilize more than one type of media device 102 and also more than one of each type of media device 102, as described above.

The media device 102 may be coupled to a communication network 230. The communication network 230 may be one or more networks including the Internet, a mobile phone network, mobile voice or data network (e.g., a 4G or LTE network), cable network, public switched telephone network, or other types of communication network or combinations of communication networks. The media device 102, the content source 210, and the application server 220 may be connected to the communication network 230 via one or more communications paths 232, such as a satellite path, a fiber-optic path, a cable path, a path that supports Internet communications (e.g., IPTV), free-space connections (e.g., for broadcast or other wireless signals), and/or any other suitable wired or wireless communications path or combination of such paths.

Although communications paths 232 are not drawn directly between the media device 102 and the content source 210 or the application server 220, these devices may communicate directly with each other via communications paths 232, such as short-range point-to-point communications paths, such as USB cables, IEEE 1394 cables, wireless paths (e.g., BLUETOOTH, infrared, IEEE 802-11x, etc.), or other short-range communication via wired or wireless paths. BLUETOOTH is a certification mark owned by Bluetooth SIG, INC. The devices may also communicate with each other directly through an indirect path via the communication network 230.

The system 200 may include more than one content source 210, but only one is shown in FIG. 2 to avoid overcomplicating the drawing. The content source 210 includes a database 212 storing subtitles and associated metadata. The metadata may include a language of the subtitles, a recommended language proficiency level of the subtitles, a media asset 108 that corresponds to the subtitles, and/or other information regarding the subtitles and their relationship to the media asset 108 (e.g., timing information indicating when the subtitles should be displayed, character information indicating a character speaking the words included in the subtitles, etc.). For example, as shown in FIG. 2A, the database 212 includes entries for the languages "English" and "French." For each language, the database 212 includes entries for three proficiency levels ("Beginner," "Intermediate," and "Fluent") and the corresponding text. For example, an English subtitle with a beginner proficiency level includes the text "That is a pretty lamp," while a French subtitle with a beginner proficiency level includes the text "Cette lampe est jolie." While FIG. 2A shows database entries for only two languages on only three proficiency levels, this is merely as an example, and those skilled in the art will recognize that the database 212 will include additional entries for other languages in which subtitles are available, and may include additional or fewer entries for proficiency levels for each language, depending on the number of subtitles available for each language and the recommended proficiency levels assigned to such subtitles.

Further, as shown in FIG. 2B, a database table 214 shows recommended language proficiency levels assigned to each word of a subtitle. For example, a beginner proficiency level may be assigned to the words "that," "is," "a," "with," "pretty," "lamp," and "golden," while an intermediate proficiency level may be assigned to the word "beautiful," and a fluent proficiency level may be assigned to the words "paraffin," "adorned," and "decoration." Thus, a recommended language proficiency level may be assigned to an entire subtitle or set of subtitles (as shown in FIG. 2A in database 212) and/or to each individual word of a subtitle (as shown in FIG. 2B in database table 214). The content source 210, either in the database 212 or in a separate data structure, stores the sets of subtitles 106 referred to in the database 212, or stores links (e.g., hyperlinks, addresses, credentials, etc.) to access the subtitles referred to in the database 212 on a different device or server (not shown in FIG. 2A). In some embodiments, the content source 210 also stores the media asset 108 corresponding to the subtitles.

The user device 102 and/or the content source 210 stores profile data associated with the user. The profile data may include information regarding the user's proficiency level in one or more languages, and/or language preferences of the user. For example, the profile data may indicate that the user's proficiency level in Italian is fluent, and that the user also has an intermediate proficiency level in French and Spanish. The profile information may additionally indicate that the user prefers French to Spanish even though the user's proficiency level in both languages is the same.

The subtitle generation application may be, for example, a stand-alone application implemented on the media device 102 described above. For example, the subtitle generation application may be implemented as software or a set of executable instructions which may be stored in storage 308 (described below with reference to FIG. 3) and executed by control circuitry 304 (described below with reference to FIG. 3) of the media device 102. In some embodiments, the subtitle generation application is a client/server-based application where only a client application resides on the media device 102, and a server application resides on the application server 220. For example, a subtitle generation application may be implemented partially as a client application on the control circuitry 304 of the media device 102 and partially on the application server 220 as a server application running on the control circuitry 304 of the application server 220. When executed by the control circuitry 304 of the application server 220, the subtitle generation application may instruct the control circuitry 304 of the content source 210 to transmit a set of subtitles 106 matching the user's proficiency level in the language 110 to the media device 102. Alternatively, if a set of subtitles 106 matching the user's proficiency level in the language 110 is not available, the subtitle generation application may instruct the control circuitry 304 of the content source 210 to transmit a set of subtitles 106 corresponding to the language 110 to the application server 220 to be modified, as described further below. In such embodiments, the server application may further instruct the control circuitry 304 of the application server 220 to generate and/or modify the set of subtitles 106 and transmit the generated or modified subtitles 106 to the media device 102. The client application may instruct the control circuitry 304 of the receiving media device 102 to generate for display and/or output the subtitles 106.

While system 200 is shown in FIG. 2A as only including the media device 102, the content source 210, and the application server 220, those skilled in the art will appreciate that the system 200 may further include various other devices, such as Internet-of-Things (IoT) devices. In some embodiments, the media device 102 may operate in a cloud computing environment to access cloud services. In a cloud computing environment, various types of computing services for content sharing, storage, or distribution (e.g., informational sites or social networking sites) are provided by a collection of network-accessible computing and storage resources, referred to as "the cloud." Cloud resources may be accessed by the media device 102 using, for example, a web browser, a desktop application, a mobile application, and/or any combination of access applications of the same. The media device 102 may be a cloud client that relies on cloud computing for application delivery, or the media device 102 may have some functionality without access to cloud resources. For example, some applications running on the media device 102 may be cloud applications, that is, applications delivered as a service over the Internet, while other applications may be stored and run on the media device 102. In some embodiments, the media device 102 uses cloud resources for processing operations, such as the processing operations performed by the processing circuitry 306 described in relation to FIG. 3.

Figure 3:
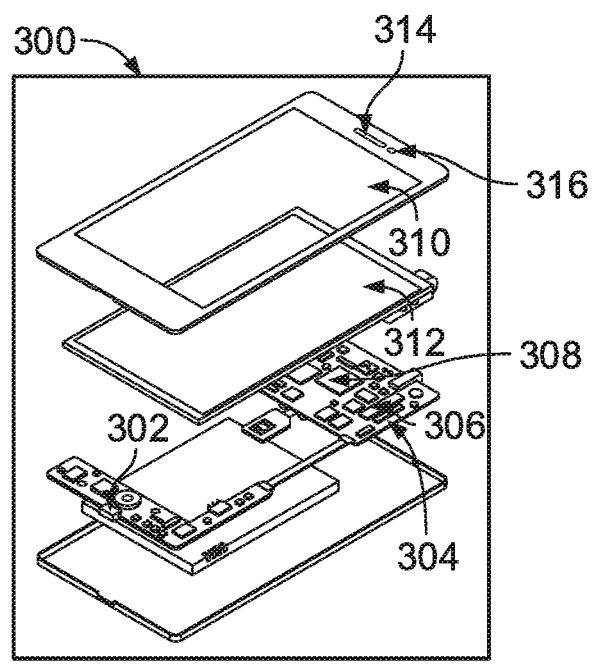
FIG. 3 shows a diagram of illustrative devices of the system of FIG. 2, in accordance with some embodiments of the disclosure.
Figure 3:
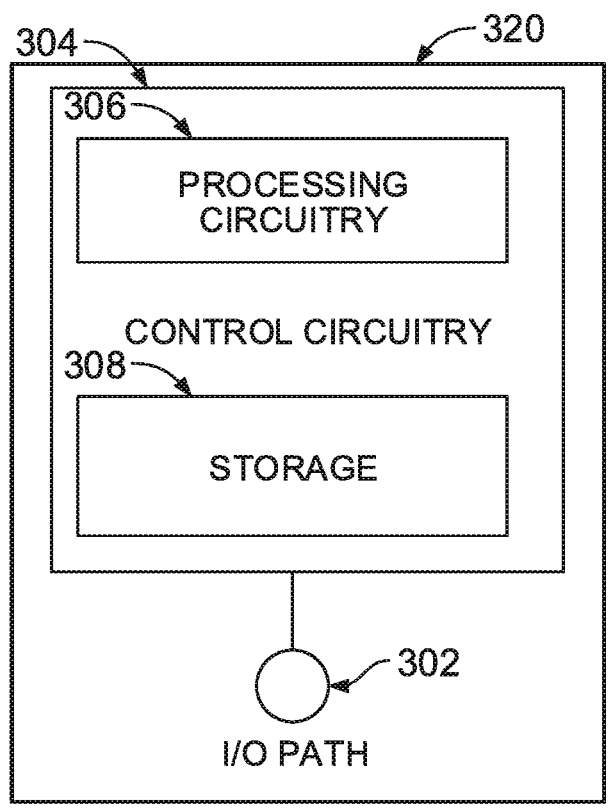

FIG. 3 shows a generalized embodiment of an illustrative media device 300. As depicted, the media device 300 may be a smartphone or tablet. The media device 300 may receive content and data via an input/output (hereinafter "I/O") path 302. The I/O path 302 may provide user input, user preferences, subtitles, media assets, and/or metadata related to any of the aforementioned to control circuitry 304, which includes processing circuitry 306 and storage 308. The control circuitry 304 may send and receive commands, requests, and other suitable data using the I/O path 302. The I/O path 302 may connect the control circuitry 304 (and specifically the processing circuitry 306) to one or more communications paths (described below). I/O functions may be provided by one or more of these communications paths but are shown as a single path in FIG. 3 to avoid overcomplicating the drawing.

The control circuitry 304 may be based on any suitable processing circuitry, such as the processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores) or supercomputer. In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, the control circuitry 304 executes instructions for a subtitle generation application stored in memory (i.e., the storage 308). Specifically, the control circuitry 304 may be instructed by the subtitle generation application to perform voice or audio processing of the user input, retrieve user profile data and/or subtitles, generate and/or modify the subtitles, and/or perform the other functions described above and below.

In client/server-based embodiments, the control circuitry 304 includes communications circuitry suitable for communicating with a subtitle generation application server or other networks or servers. The instructions for carrying out the above-mentioned functionality may be stored on a server. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths. In addition, the communications circuitry may include circuitry that enables peer-to-peer communication of media devices, or communication of media devices in locations remote from each other.

The memory may be an electronic storage device provided as the storage 308 that is part of the control circuitry 304. As referred to herein, the phrase "electronic storage device" or "storage device" should be understood to mean any device for storing electronic data, computer software, or firmware, such as random-access memory, hard drives, optical drives, solid state devices, quantum storage devices, or any other suitable fixed or removable storage devices, and/or any combination of the same. Nonvolatile memory may also be used. Cloud-based storage, described in relation to FIG. 2A, may be used to supplement the storage 308 or instead of the storage 308.

The control circuitry 304 may include voice and/or audio processing circuitry, other digital encoding or decoding circuitry, or any other suitable audio circuits or combinations of such circuits. Encoding circuitry (e.g., for converting received audio input or digital signals to audio signals for analysis or storage) may also be provided. The audio circuitry may be used by the media device 300 to receive and process audio input (e.g., the request 104) to determine the language 110 requested by the user and/or to determine the user's identity. Image processing circuitry may likewise be used to determine the user's identity (e.g., by receiving an image captured by a camera included in or associated with the media device 102, and identifying the user based on the image). The circuitry described herein, including, for example, audio processing, image processing, encoding, decoding, and analog/digital circuitry, may be implemented using software running on one or more general purpose or specialized processors. Multiple circuits may be provided to handle simultaneous processing functions. If the storage 308 is provided as a separate device from the media device 300, the circuitry may be associated with the storage 308.

A user may send instructions to the control circuitry 304 using a user input interface 310 of the media device 300. The user input interface 310 may be any suitable user interface, such as a remote control, mouse, trackball, keypad, keyboard, touchscreen, touchpad, stylus input, joystick, or other user input interfaces. Display 312 may be a touchscreen or touch-sensitive display. In such circumstances, user input interface 310 may be integrated with or combined with the display 312. A camera, microphone 316, or other visual or voice recognition interface may also be used to receive user input (e.g., the request 104) and/or identify the user. Speakers 314 may be provided as integrated with other elements of the media device 300.

The subtitle generation application may be implemented using any suitable architecture. For example, it may be a stand-alone application wholly implemented on the media device 300. The subtitle generation application and/or any instructions for performing any of the embodiments discussed herein may be encoded on computer-readable media. Computer-readable media includes any media capable of storing data. In some embodiments, the subtitle generation application is a client/server-based application. Data for use by a thick or thin client implemented on the media device 300 is retrieved on demand by issuing requests to a server remote to the media device 300, as described above. For example, the media device 300 may receive inputs from the user via the input interface 310 or the microphone 316 and transmit those inputs to the remote server (e.g., the application server 220) for processing and retrieving or generating the outputs or data (e.g., the subtitles 106). The subtitles 106 are then transmitted to the media device 300 to be output to the user. Those skilled in the art will appreciate that the media device 102 of FIG. 1 may be implemented as the media device 300 of FIG. 3.

Figure 4:
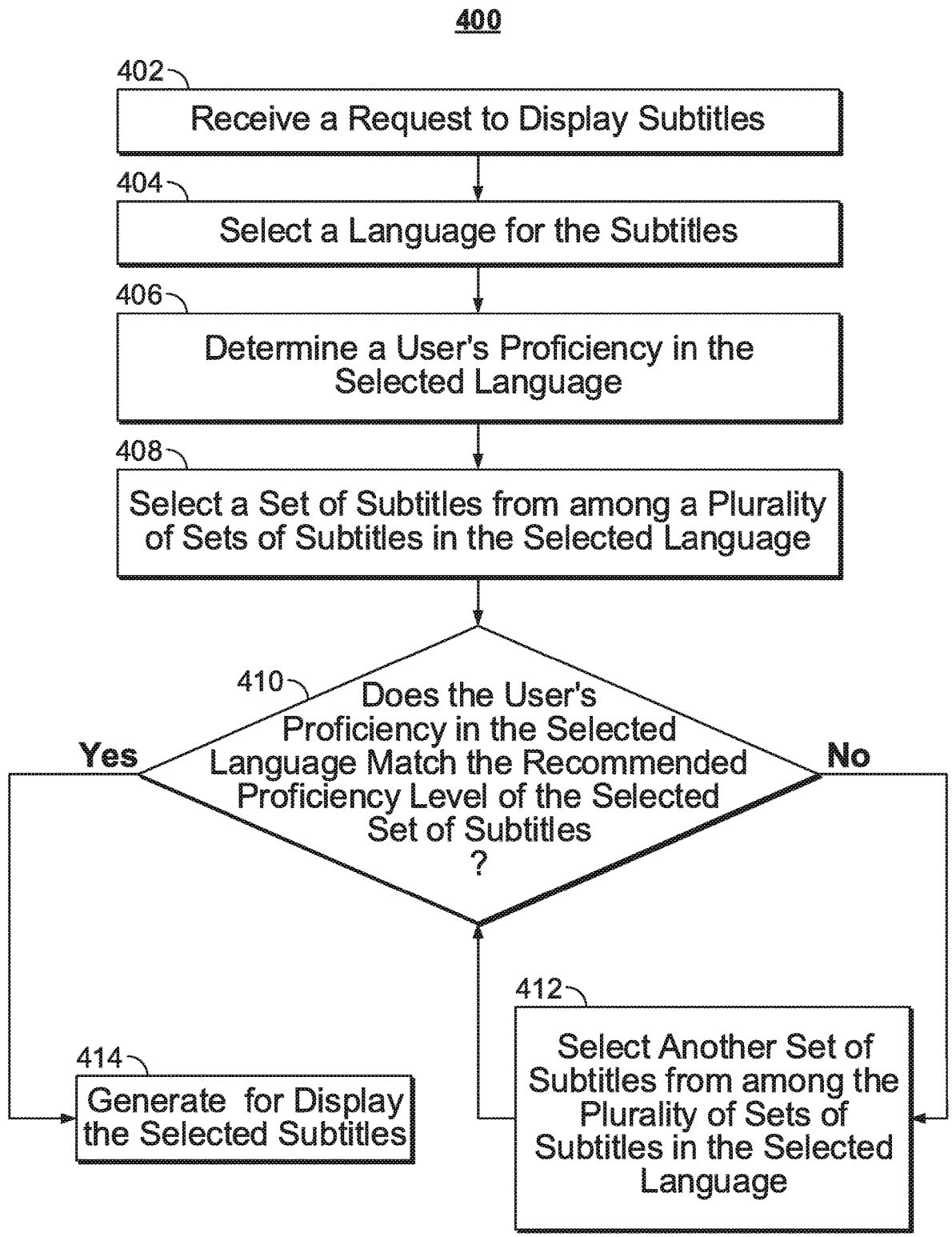
FIG. 4 is a flowchart of an illustrative process for providing subtitles based on a user's language proficiency, in accordance with some embodiments of the disclosure.

FIG. 4 is a flowchart of an illustrative process for providing subtitles based on a user's language proficiency, in accordance with some embodiments of the disclosure. A process 400 for providing subtitles 106 based on a user's language proficiency may begin at block 402, where control circuitry, such as the control circuitry 304, receives a request (such as the request 104) to display subtitles for a media asset 108. For example, the control circuitry 304 of the media device 102 may receive a voice prompt from the user via the microphone 316. The control circuitry 304 then processes the voice prompt locally at the media device 102 or transmits the voice prompt to the application server 220 to be processed remotely, to analyze the audio of the voice prompt and identify a plurality of words included in the voice prompt (e.g., by digital signal processing, audio template matching, keyword identification, etc.). Once the plurality of words are identified, the control circuitry 304 determines, based on the plurality of words, that the request 104 includes a command to display subtitles. For example, the control circuitry 304 may perform keyword matching to identify particular words or phrases and may determine that the particular words or phrases correspond to a command to display subtitles. In some embodiments, the control circuitry 304 may further identify the user based on the request 104. For example, the control circuitry 304 may identify the user by matching the sound of the user's voice (as received in the request 104) to a voice profile associated with the user. Additionally or alternatively, the control circuitry 304 may receive an image of the user captured via a camera associated with the media device 102 and may identify the user based on the image. The control circuitry 304 may further identify the user based on an association of the media device 102 to the user, and/or based on an account or profile used to access the media device 102.

At block 404, the control circuitry 304 selects a language 110 for the subtitles. In some embodiments, the request 104 includes a specification of a particular language 110 for the subtitles. For example, as shown in FIG. 1, the user may provide a request 104 to "Add French subtitles." The control circuitry 304 may then determine, based on identifying the word "French" in the request 104, that the user wants French subtitles added to the display of the media asset 108, and may select French as the language 110 for the subtitles. In other embodiments, the request 104 does not specify a particular language 110 for the subtitles, but rather only includes a command to display subtitles. In such embodiments, the control circuitry 304 may determine the language 110 for the subtitles based on a profile associated with the user. The control circuitry 304 may retrieve, from the profile associated with the user, language preferences and proficiency levels of the user. For example, the profile associated with the user may indicate that the user is fluent in Italian, moderately proficient in French and Spanish, and has only a beginner-level proficiency in English. The profile may further indicate that the user prefers French over Spanish. Based on this data, the control circuitry 304 may determine that the user's subtitle language preferences are, in order, Italian, French, Spanish, and English. The control circuitry 304 may then determine in which of the user's preferred languages subtitles 106 are available and may select the language 110 for the subtitles 106 based on the user's subtitle language preference order and the availability of subtitles 106 in those languages. For example, if subtitles 106 for a media asset 108 are available in Italian, Spanish, and English, the control circuitry 304 will select Italian as the language 110 for the subtitles 106. Alternatively, if subtitles 106 for the media asset 108 are available only in French, English, and German, the control circuitry 304 will select French as the language 110 for the subtitles 106.

At block 406, the control circuitry 304 determines the user's proficiency in the selected language 110 for the subtitles 106. In some embodiments, the control circuitry 304 retrieves, from the profile associated with the user, the language proficiency levels of the user. For example, the profile associated with the user may indicate that the user is fluent in Italian, moderately proficient in French and Spanish, and has only a beginner-level proficiency in English. In other embodiments, the control circuitry 304 may generate a prompt to be output to the user requesting that the user provide the user's proficiency level in the selected language 110. For example, if the user's proficiency level in the selected language 110 is not included in the profile, the control circuitry 304 may generate for display a prompt asking the user to provide input indicating the user's proficiency level in the selected language 110. The control circuitry 304 may then receive the input from the user indicating the user's proficiency level in the selected language 110.

At block 408, the control circuitry 304 selects a set of subtitles 106 from among a plurality of sets of subtitles 106 in the selected language 110 for the media asset 108. As further described below with reference to FIG. 5, the database 212 may include multiple sets of subtitles 106 in multiple languages 110 for the media asset 108, and the control circuitry 304 may retrieve, from the database 212, a set of subtitles 106 in the selected language 108.

At block 410, the control circuitry 304 determines whether the user's proficiency in the selected language 110, as determined at block 406, matches the recommended proficiency level of the selected set of subtitles 106. For example, the control circuitry 304 may compare the user's proficiency level in the selected language 110 with the recommended language proficiency level assigned to the selected set of subtitles 106. In response to determining that the user's proficiency level in the selected language 110 does not match the recommended language proficiency level assigned to the selected set of subtitles 106, the process 400 proceeds to block 412. In response to determining that the user's proficiency level in the selected language 110 matches the recommended language proficiency level assigned to the selected set of subtitles 106, the process 400 proceeds to block 414.

At block 412, the control circuitry 304 selects another set of subtitles 106 from among the plurality of sets of subtitles 106 in the selected language 110. For example, the control circuitry 304 may retrieve a different set of subtitles 106 from the database 212.

At block 414, the control circuitry 304 generates for display the selected subtitles 106. For example, the control circuitry 304 may match timing information included in metadata associated with the subtitles 106 to timing information of the media asset 108 and cause the media device 102 to display a subtitle 106 with timing information matching a current play position of the media asset 108.

Figure 5:
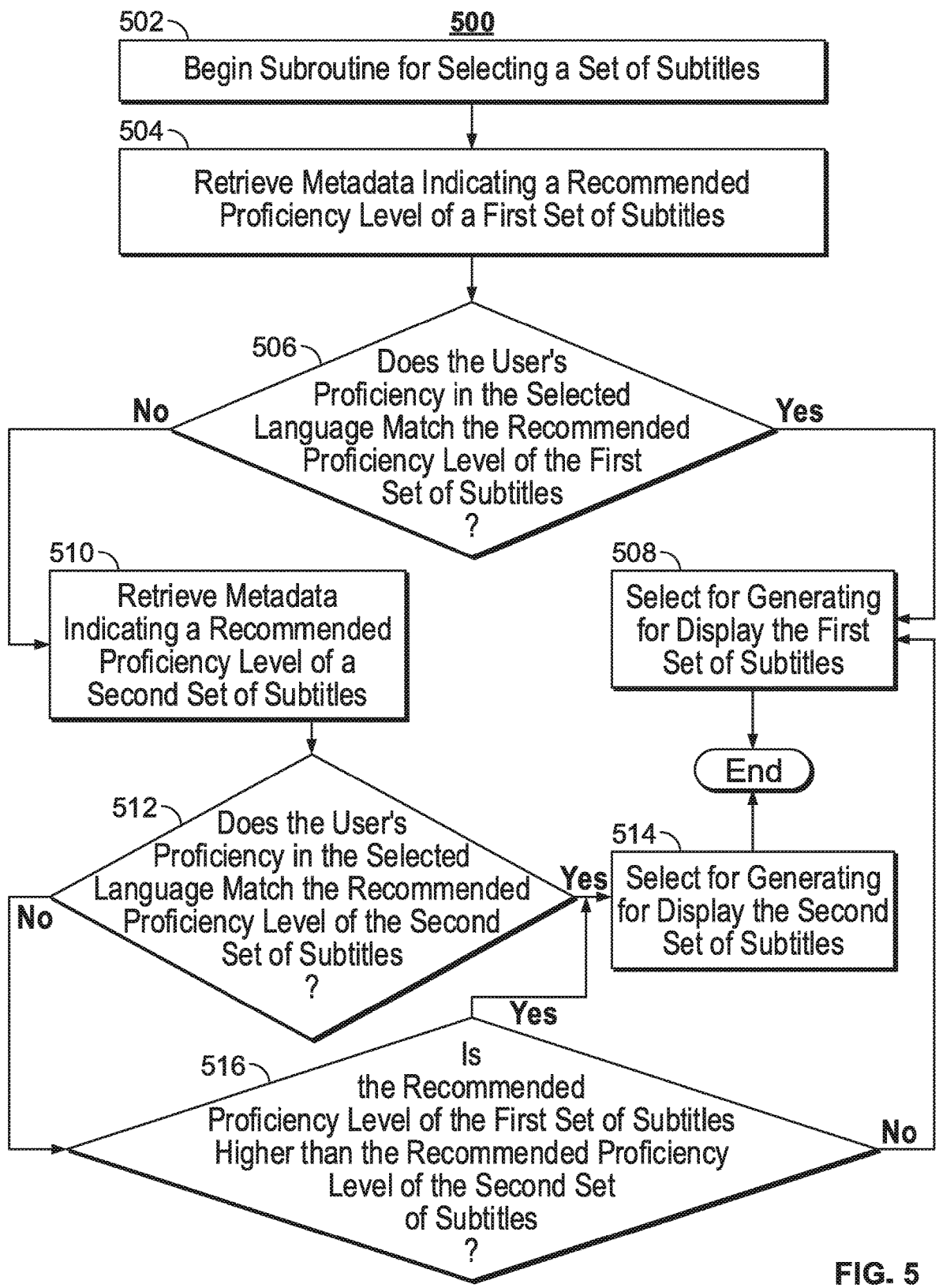
FIG. 5 is a flowchart of a detailed illustrative process for selecting a set of subtitles, in accordance with some embodiments of the disclosure.

FIG. 5 is a flowchart of a detailed illustrative process for selecting a set of subtitles, in accordance with some embodiments of the disclosure. A process 500 for selecting a set of subtitles may begin at block 502. At block 504, the control circuitry 304 retrieves metadata indicating a recommended language proficiency level assigned to a first set of subtitles 106. For example, the control circuitry 304 may query the database 212 for metadata indicating the recommended language proficiency level assigned to a first set of subtitles 106.

At block 506, the control circuitry 304 determines whether the user's language proficiency level in the language selected at block 404 matches the recommended language proficiency level assigned to the first set of subtitles 106. For example, the control circuitry 304 may compare the user's proficiency level in the selected language 110 with the recommended language proficiency level assigned to the first set of subtitles 106. In response to determining that the user's proficiency level in the selected language 110 matches the recommended language proficiency level assigned to the first set of subtitles 106, the process 500 proceeds to block 508. In response to determining that the user's proficiency level in the selected language 110 does not match the recommended language proficiency level assigned to the first set of subtitles 106, the process 500 proceeds to block 510.

At block 508, the control circuitry 304 selects for generating for display the first set of subtitles 106. For example, the control circuitry 304 may retrieve the first set of subtitles 106 from the database 212.

At block 510, the control circuitry 304 retrieves metadata indicating a recommended language proficiency level assigned to a second set of subtitles 106. For example, the control circuitry 304 may query the database 212 for metadata indicating the recommended language proficiency level assigned to a second set of subtitles 106.

At block 512, the control circuitry 304 determines whether the user's language proficiency level in the language selected at block 404 matches the recommended language proficiency level assigned to the second set of subtitles 106. For example, the control circuitry 304 may compare the user's proficiency level in the selected language 110 with the recommended language proficiency level assigned to the second set of subtitles 106. In response to determining that the user's proficiency level in the selected language 110 matches the recommended language proficiency level assigned to the second set of subtitles 106, the process 500 proceeds to block 514. In response to determining that the user's proficiency level in the selected language 110 does not match the recommended language proficiency level assigned to the second set of subtitles 106, the process 500 proceeds to block 516.

At block 514, the control circuitry 304 selects for generating for display the second set of subtitles 106. For example, the control circuitry 304 may retrieve the second set of subtitles 106 from the database 212.

At block 516, the control circuitry 304 determines whether the recommended language proficiency level assigned to the first set of subtitles 106 is higher than the recommended language proficiency level assigned to the second set of subtitles 106. For example, the control circuitry 304 may compare the recommended language proficiency level assigned to the first set of subtitles 106 to the recommended language proficiency level assigned to the second set of subtitles 106 and determine which assigned language proficiency level is higher. In response to determining that the recommended language proficiency level assigned to the first set of subtitles 106 is higher than the recommended language proficiency level assigned to the second set of subtitles 106, the process 500 returns to block 514. In response to determining that the recommended language proficiency level assigned to the first set of subtitles 106 is not higher than the recommended language proficiency level assigned to the second set of subtitles 106, the process 500 returns to block 508.

Figure 6:
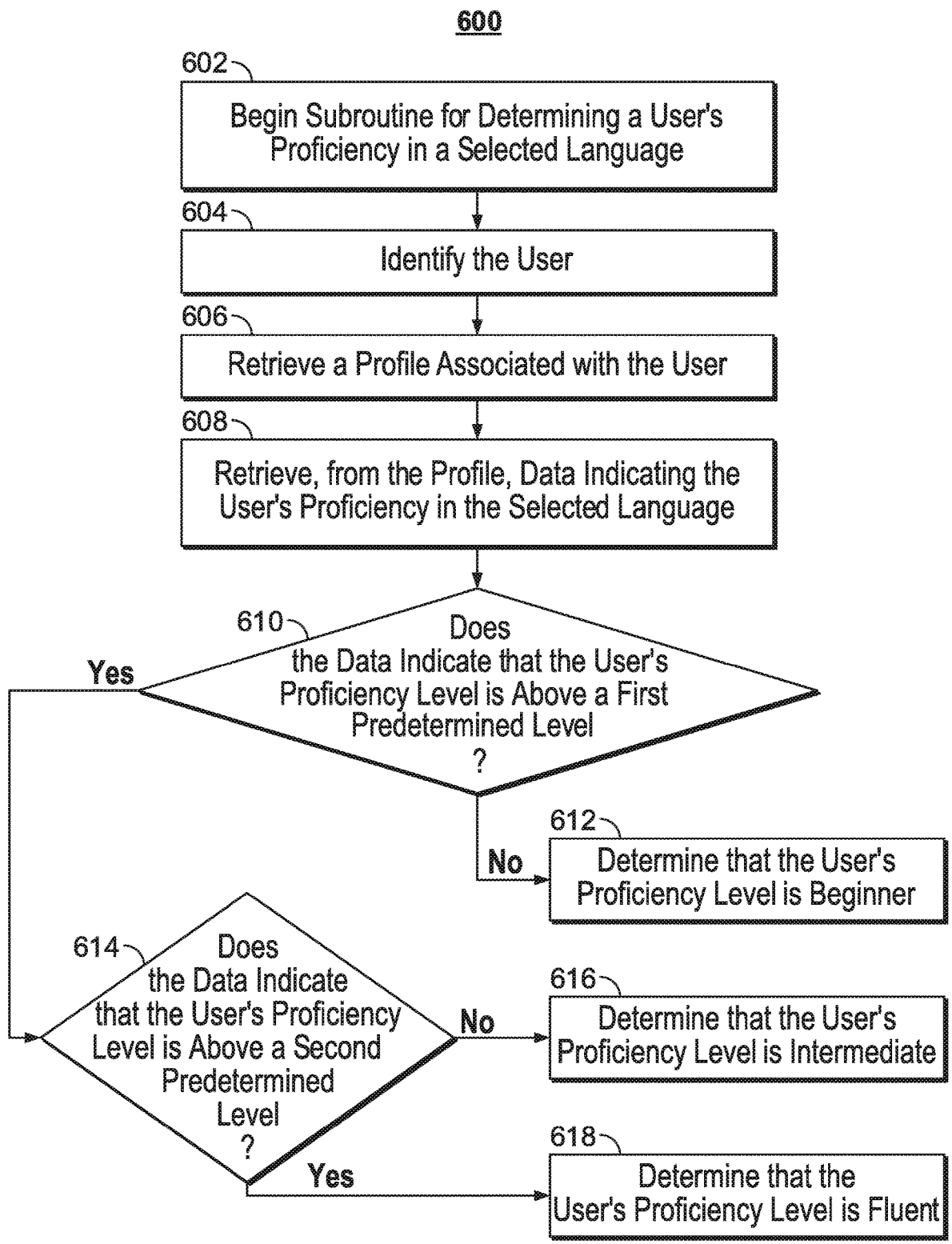
FIG. 6 is a flowchart of a detailed illustrative process for determining a user's proficiency in a selected language, in accordance with some embodiments of the disclosure.

FIG. 6 is a flowchart of a detailed illustrative process for determining a user's proficiency in a selected language, in accordance with some embodiments of the disclosure. A process 600 for determining a user's proficiency in a selected language may begin at block 602. At block 604, the control circuitry 304 identifies the user. The control circuitry 304 may identify the user based on the request 104. For example, the control circuitry 304 may identify the user by matching the sound of the user's voice (as received in the request 104) to a voice profile associated with the user. Additionally or alternatively, the control circuitry 304 may receive an image of the user captured via a camera associated with the media device 102 and may identify the user based on the image. The control circuitry 304 may further identify the user based on an association of the media device 102 to the user, and/or based on an account or profile used to access the media device 102.

At block 606, the control circuitry 304 retrieves a profile associated with the user. For example, the control circuitry 304 may retrieve, from the storage 308 of the media device 102 and/or from the content source 210, a profile associated with the identity of the user as determined at block 604.

At block 608, the control circuitry 304 retrieves, from the profile, data indicating the user's proficiency in the language 110 selected at block 404. For example, the control circuitry 304 may retrieve, from the profile, data indicating that the user is fluent in Italian, moderately proficient in French and Spanish, and has only a beginner-level proficiency in English. In some embodiments, the data indicating the user's proficiency in the language 110 includes data indicating the user's reading speed in the language 110. For example, the control circuitry 304 may retrieve the data indicating the user's reading speed in the language 110 from the user profile. In some embodiments, the user profile and/or the data indicating the user's reading speed in the language 110 are stored on a separate device, such as an Internet-of-Things (IoT) device. In such embodiments, the control circuitry 304 may retrieve the user profile and/or the data indicating the user's reading speed in the language 110 from the IoT device.

At block 610, the control circuitry 304 determines whether the data indicates that the user's language proficiency level in the selected language 110 is above a first predetermined level. For example, if the first predetermined level is beginner and the selected language is English, the control circuitry 304 will determine the user's language proficiency level in English is not above the first predetermined level because the user's proficiency in English is beginner-level, and thus equal to, not above, beginner. Alternatively, if the first predetermined level is beginner and the selected language is Italian, French, or Spanish, the control circuitry 304 will determine that the user's language proficiency level in the selected language is above the first predetermined level because the user's language proficiency level in French, Spanish, and Italian is above beginner. In response to determining that the user's language proficiency level in the selected language 110 is not above the first predetermined level, the process 600 proceeds to block 612. In response to determining that the user's language proficiency level in the selected language 110 is above the first predetermined level, the process 600 proceeds to block 614.

At block 612, the control circuitry 304 determines that the user's language proficiency level in the selected language 110 is beginner.

At block 614, the control circuitry 304 determines whether the data indicates that the user's language proficiency level in the selected language 110 is above a second predetermined level. For example, if the second predetermined level is intermediate and the selected language is Italian, the control circuitry 304 will determine that the user's language proficiency level in Italian is above the second predetermined level because the user's proficiency in Italian is fluent. Alternatively, if the selected language is French or Spanish, the control circuitry 304 will determine that the user's language proficiency level in the selected language is not above the second predetermined level because the user's language proficiency level in French and Spanish is not above intermediate (it is equal to intermediate). In response to determining that the user's language proficiency level in the selected language 110 is not above the second predetermined level, the process 600 proceeds to block 616. In response to determining that the user's language proficiency level in the selected language 110 is above the second predetermined level, the process 600 proceeds to block 618.

At block 616, the control circuitry 304 determines that the user's language proficiency level in the selected language 110 is intermediate.

At block 618, the control circuitry 304 determines that the user's language proficiency level in the selected language 110 is fluent.

Figure 7:
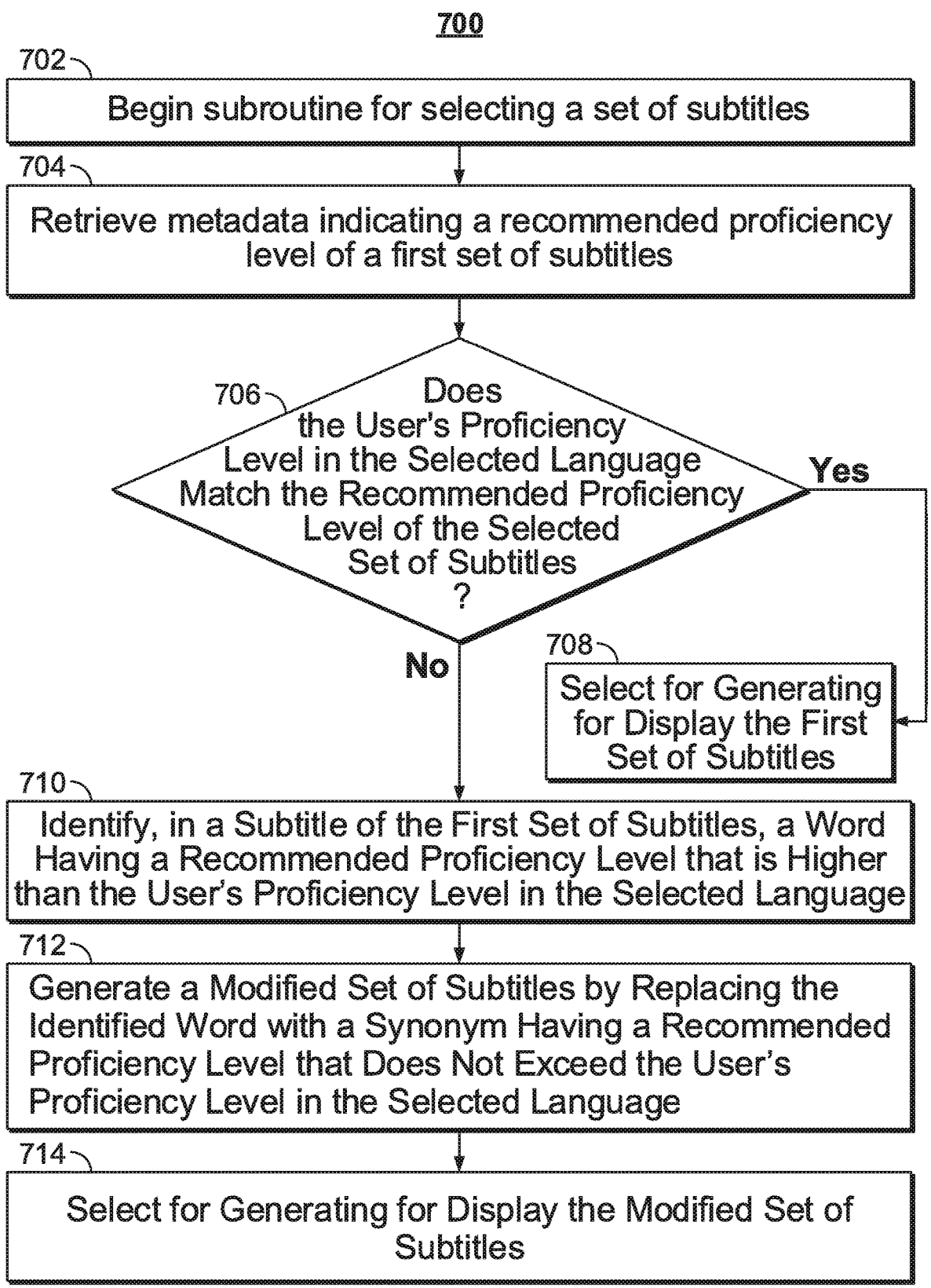
FIG. 7 is a flowchart of a detailed illustrative process for selecting a set of subtitles, in accordance with some embodiments of the disclosure.

FIG. 7 is a flowchart of a detailed illustrative process for selecting a set of subtitles 106, in accordance with some embodiments of the disclosure. A process 700 for selecting a set of subtitles 106 may begin at block 702. At block 704, the control circuitry 304 retrieves metadata indicating a recommended language proficiency level assigned to a first set of subtitles 106. For example, the control circuitry 304 may query the database 212 for metadata indicating the recommended language proficiency level assigned to the first set of subtitles 106.

At block 706, the control circuitry 304 determines whether the user's language proficiency level in language 110 selected at block 404 matches the recommended language proficiency level assigned to the first set of subtitles 106. For example, the control circuitry 304 may compare the user's language proficiency level in the selected language 110 with the recommended language proficiency level assigned to the first set of subtitles 106 to determine whether they match. In response to determining that the user's language proficiency level in the selected language 110 matches the recommended language proficiency level assigned to the first set of subtitles 106, the process 700 proceeds to block 708. In response to determining that the user's language proficiency level in the selected language 110 does not match the recommended language proficiency level assigned to the first set of subtitles 106, the process 700 proceeds to block 710.

At block 708, the control circuitry 304 selects for generating for display the first set of subtitles 106. For example, the control circuitry 304 may retrieve the first set of subtitles 106 from the database 212.

At block 710, the control circuitry 304 identifies, in a subtitle of the first set of subtitles 106, a word having a recommended language proficiency level that is higher than the user's language proficiency level in the selected language 110. For example, the control circuitry 304 may query the database 212 to retrieve from database table 214 a word with a recommended language proficiency level that is higher than the user's language proficiency level in the selected language 110. Using the example shown in FIG. 2B, if the selected language 110 is English, the user's language proficiency level in English is beginner, and the recommended language proficiency level of the first set of subtitles 106 is intermediate, the control circuitry 304 will query the database 212 for one or more words included in the subtitle that have an assigned recommended language proficiency level of intermediate. In this instance, the database table 214 shows that the only word included in the subtitle that has an assigned recommended language proficiency level of intermediate is the word "beautiful." Accordingly, the database 212 may respond to the query from the control circuitry 304 with the word "beautiful."

At block 712, the control circuitry 304 generates a modified set of subtitles by replacing the identified word with a synonym having a recommended language proficiency level that does not exceed the user's language proficiency level in the selected language 110. For example, the control circuitry 304 may query the database 212 for a synonym to the word "beautiful" that has a recommended language proficiency level that does not exceed the user's language proficiency level in the selected language 110. Again using the example shown in FIG. 2B, the control circuitry 304 may determine that the word "pretty" is a synonym for the word "beautiful" and that the word "pretty" is assigned a recommended language proficiency level of beginner. The control circuitry 304 may further determine, based on metadata and/or a language syntax engine, whether it is grammatically correct to substitute the word "pretty" for the word "beautiful." For example, the language syntax engine may indicate whether grammatical and/or syntactical modifications also need to be made to the subtitle in order to substitute the word "pretty" for the word "beautiful." The control circuitry 304 may then modify the subtitle by substituting the word "pretty" for the word "beautiful" and making such other changes to the subtitle as indicated by the language syntax engine. While described here as word-level replacement, those skilled in the art will recognize that the same or similar techniques as described here may also be used to perform phrase or full sentence replacement.

At block 714, the control circuitry 304 selects for generating for display the modified set of subtitles 106. For example, after modifying the first set of subtitles 106 to replace all words having assigned recommended language proficiency levels that exceed the user's language proficiency level in the selected language 110, the modified set of subtitles 106 will match the user's language proficiency level in the selected language 110. The control circuitry 304 may thus generate for display the modified set of subtitles 106 as a set of subtitles 106 that matches the user's language proficiency level in the selected language 110.

Figure 8:
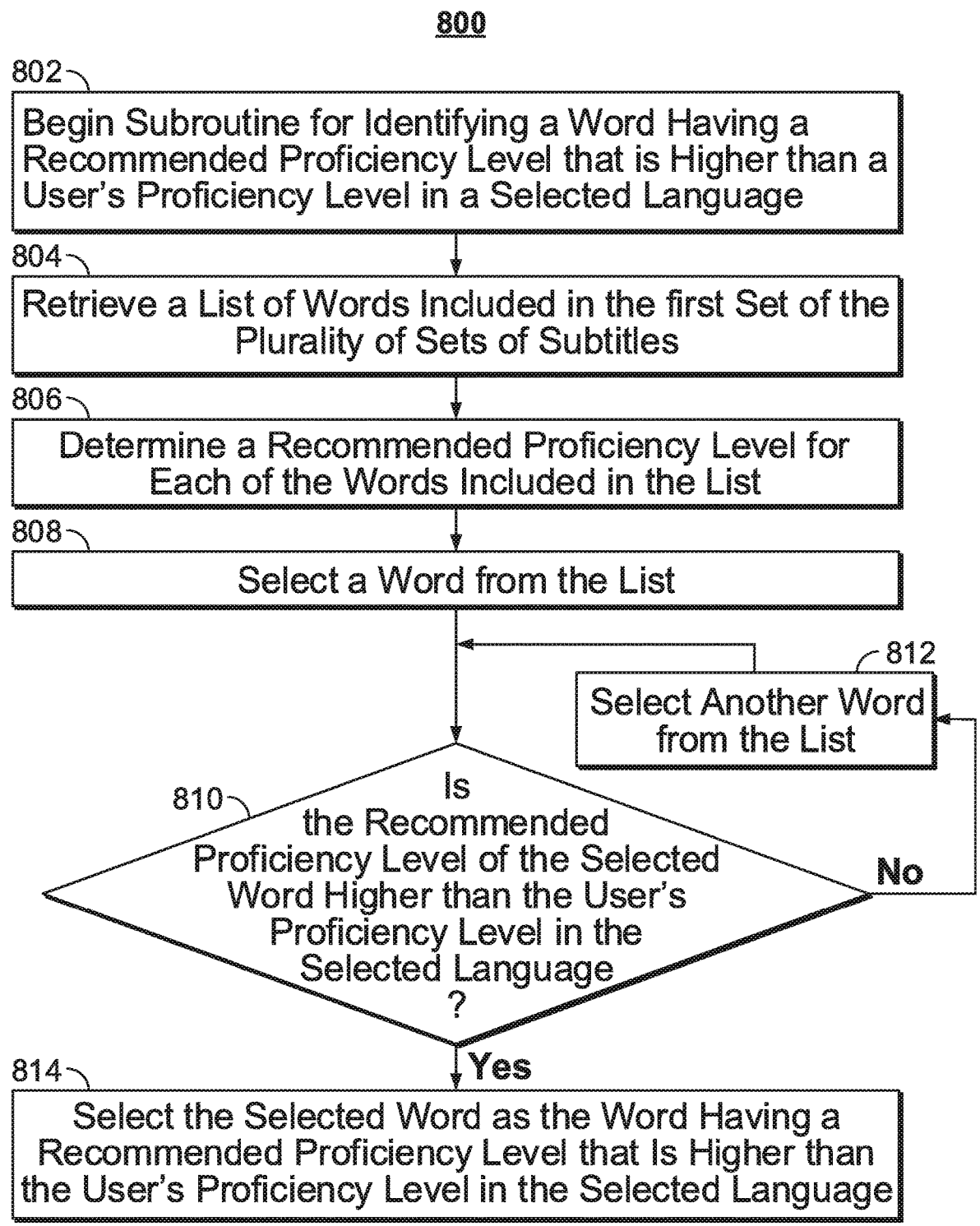
FIG. 8 is a flowchart of another detailed illustrative process for identifying a word having a recommended proficiency level that is higher than a user's proficiency level in a selected language, in accordance with some embodiments of the disclosure.

FIG. 8 is a flowchart of a detailed illustrative process for identifying a word having a recommended language proficiency level that is higher than a user's language proficiency level in the language 110 selected at block 404, in accordance with some embodiments of the disclosure. A process 800 for identifying a word having a recommended language proficiency level that is higher than a user's language proficiency level in the selected language 110 may begin at block 802. At block 804, the control circuitry 304 retrieves a list of words included in the first set of the plurality of sets of subtitles 106. For example, the control circuitry 304 may query the database 212 for a list of words included in the first set of subtitles 106.

At block 806, the control circuitry 304 determines a recommended language proficiency level for each of the words included in the list. For example, the control circuitry 304 may determine the recommended language proficiency level of each of the words included in the list based on metadata associated with the list or the words, by querying a database, such as database table 214, and/or by querying an external source, such as a thesaurus or other table indicating recommended language proficiency levels assigned to words.

At block 808, the control circuitry 304 selects a word from the list. For example, the control circuitry 304 may select a first word in the list or may order the list in alphabetical (or some other predetermined) order and then select the first word in the list.

At block 810, the control circuitry 304 determines whether the recommended language proficiency level assigned to the selected word is higher than the user's language proficiency level in the selected language 110. For example, the control circuitry 304 may compare the recommended language proficiency level assigned to the selected word with the user's language proficiency level in the selected language 110 to determine which is higher. In response to determining that the recommended language proficiency level assigned to the selected word is not higher than the user's language proficiency level in the selected language 110, the process 800 proceeds to block 812. In response to determining that the recommended language proficiency level assigned to the selected word is higher than the user's language proficiency level in the selected language 110, the process 800 proceeds to block 814.

At block 812, the control circuitry 304 selects another word from the list. For example, the control circuitry 304 may select the next word from the list in the same order as selecting the previous word from the list at block 808.

At block 814, the control circuitry 304 selects the word selected at block 808 or block 812 as the word having a recommended language proficiency level that is higher than the user's language proficiency level in the selected language 110.

Figure 9:
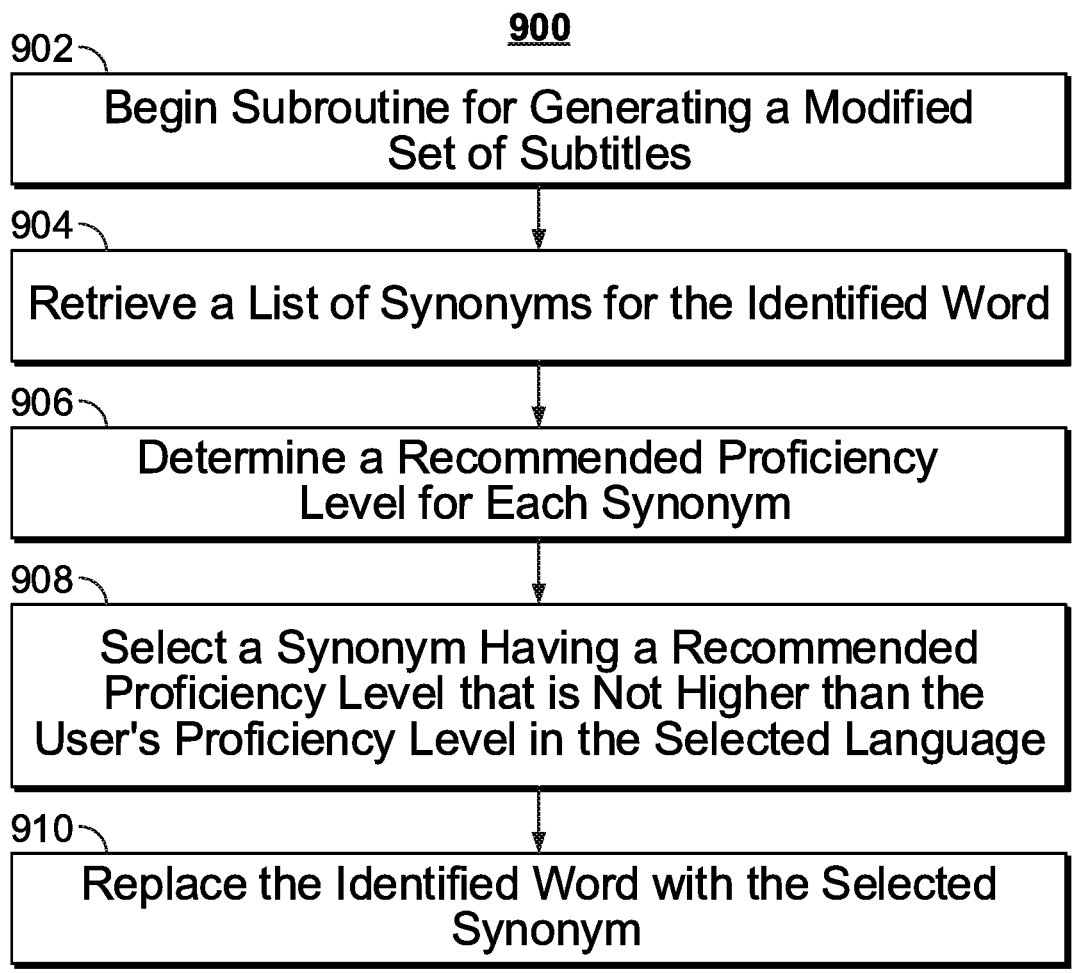
FIG. 9 is a flowchart of a detailed illustrative process for generating a modified set of subtitles, in accordance with some embodiments of the disclosure.

FIG. 9 is a flowchart of a detailed illustrative process for generating a modified set of subtitles 106, in accordance with some embodiments of the disclosure. A process 900 for generating a modified set of subtitles 106 may begin at block 902. At block 904, the control circuitry 304 retrieves a list of synonyms for the word identified at block 710. For example, the control circuitry 304 may query the database 212 or an external source (such as a thesaurus) for a list of synonyms of the identified word.

At block 906, the control circuitry 304 determines a recommended language proficiency level assigned to each synonym of the word. For example, the control circuitry 304 may identify, based on metadata or by querying the database 212, the recommended language proficiency level assigned to each synonym.

At block 908, the control circuitry 304 selects, from the list of synonyms, a synonym having a recommended language proficiency level that is not higher than the user's language proficiency level in the selected language 110. For example, the control circuitry 304 may compare the language proficiency level assigned to each synonym with the user's language proficiency level in the selected language 110 to determine which synonyms have an assigned recommended language proficiency that is not higher than the user's language proficiency level in the selected language 110. Alternatively, the control circuitry 304 may query the database 212 for a synonym, from the list of synonyms, having an assigned recommended language proficiency level that is not higher than the user's language proficiency level in the selected language 110.

At block 910, the control circuitry 304 replaces the identified word with the selected synonym. In some embodiments, the control circuitry 304 simply substitutes the synonym for the identified word. In other embodiments, the control circuitry 304 further determines, based on metadata and/or a language syntax engine, whether it is grammatically correct to substitute the synonym for the identified word. For example, a language syntax engine may indicate whether grammatical and/or syntactical modifications also need to be made to the subtitle in order to substitute the synonym for the identified word. The control circuitry 304 may then substitute the synonym for the identified word and make such other changes to the subtitle as indicated by the language syntax engine.

Figure 10:
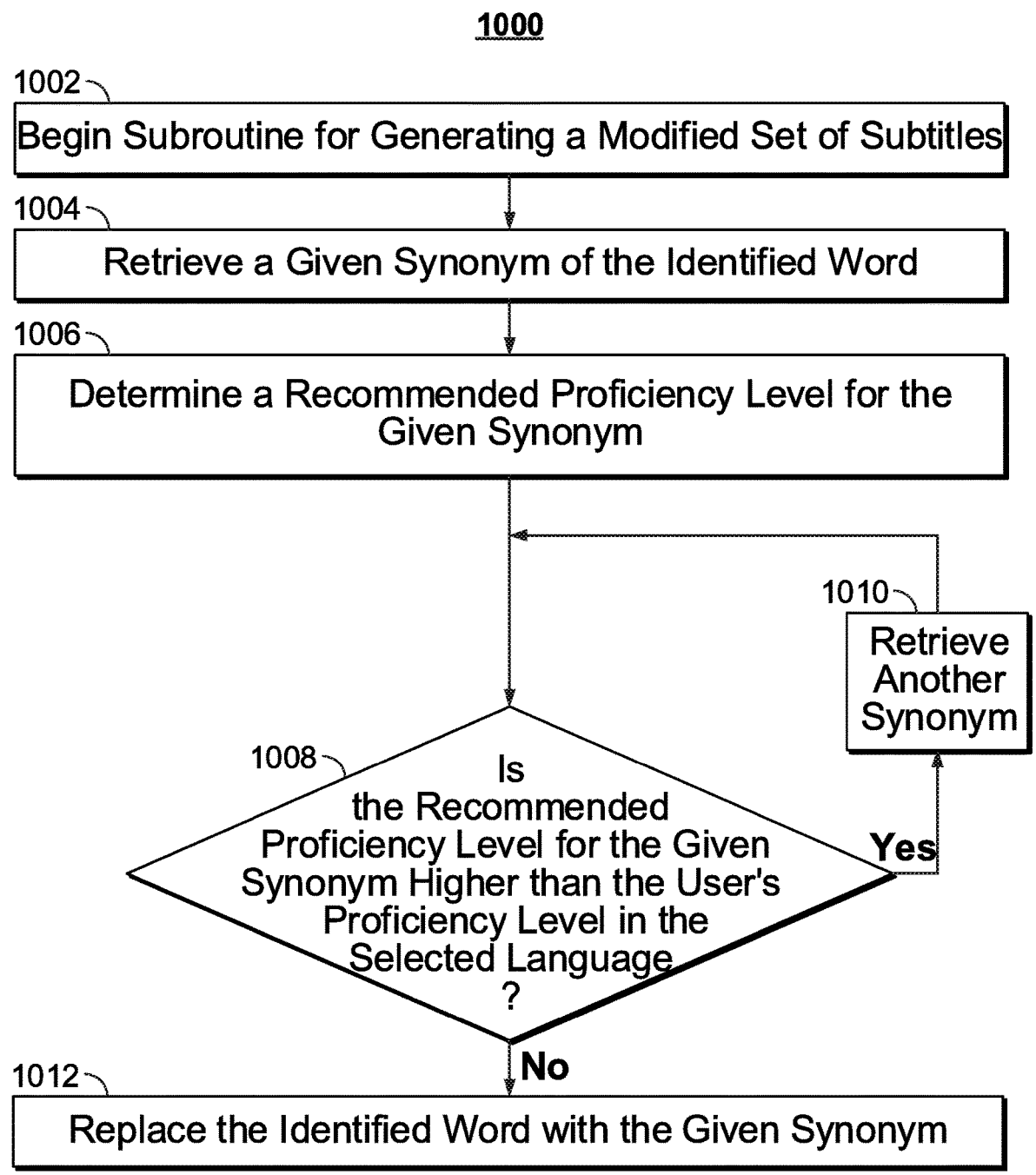
FIG. 10 is a flowchart of a detailed illustrative process for generating a modified set of subtitles, in accordance with some embodiments of the disclosure.

FIG. 10 is a flowchart of a detailed illustrative process for generating a modified set of subtitles 106, in accordance with some embodiments of the disclosure. A process 1000 for generating a modified set of subtitles 106 may begin at block 1002. At block 1004, the control circuitry 304 retrieves, from the database 212 or from the list of synonyms retrieved at block 904, a given synonym of the word identified at block 710.

At block 1006, the control circuitry 304 determines a recommended language proficiency level assigned to the given synonym selected at block 1004. For example, the control circuitry 304 may query the database 212 or another data source for the recommended language proficiency level assigned to the given synonym.

At block 1008, the control circuitry 304 determines whether the recommended language proficiency level assigned to the given synonym is higher than the user's language proficiency level in the language 110 selected at block 404. For example, the control circuitry 304 may compare the recommended language proficiency level assigned to the given synonym with the user's language proficiency level in the selected language 110 to determine which is higher. In response to determining that the recommended language proficiency level assigned to the given synonym is higher than the user's language proficiency level in the selected language 110, the process 1000 proceeds to block 1010. In response to determining that the recommended language proficiency level assigned to the given synonym is not higher than the user's language proficiency level in the selected language 110, the process 1000 proceeds to block 1012.

At block 1010, the control circuitry retrieves another synonym. For example, the control circuitry 304 may retrieve another synonym from the database 212 or from the list of synonyms retrieved at block 904.

At block 1012, the control circuitry 304 replaces the identified word with the given synonym. In some embodiments, the control circuitry 304 simply substitutes the retrieved synonym for the identified word. In other embodiments, the control circuitry 304 further determines, based on metadata and/or a language syntax engine, whether it is grammatically correct to substitute the retrieved synonym for the identified word. For example, a language syntax engine may indicate whether grammatical and/or syntactical modifications also need to be made to the subtitle in order to substitute the retrieved synonym for the identified word. The control circuitry 304 may then substitute the retrieved synonym for the identified word and make such other changes to the subtitle as indicated by the language syntax engine.

Figure 11:
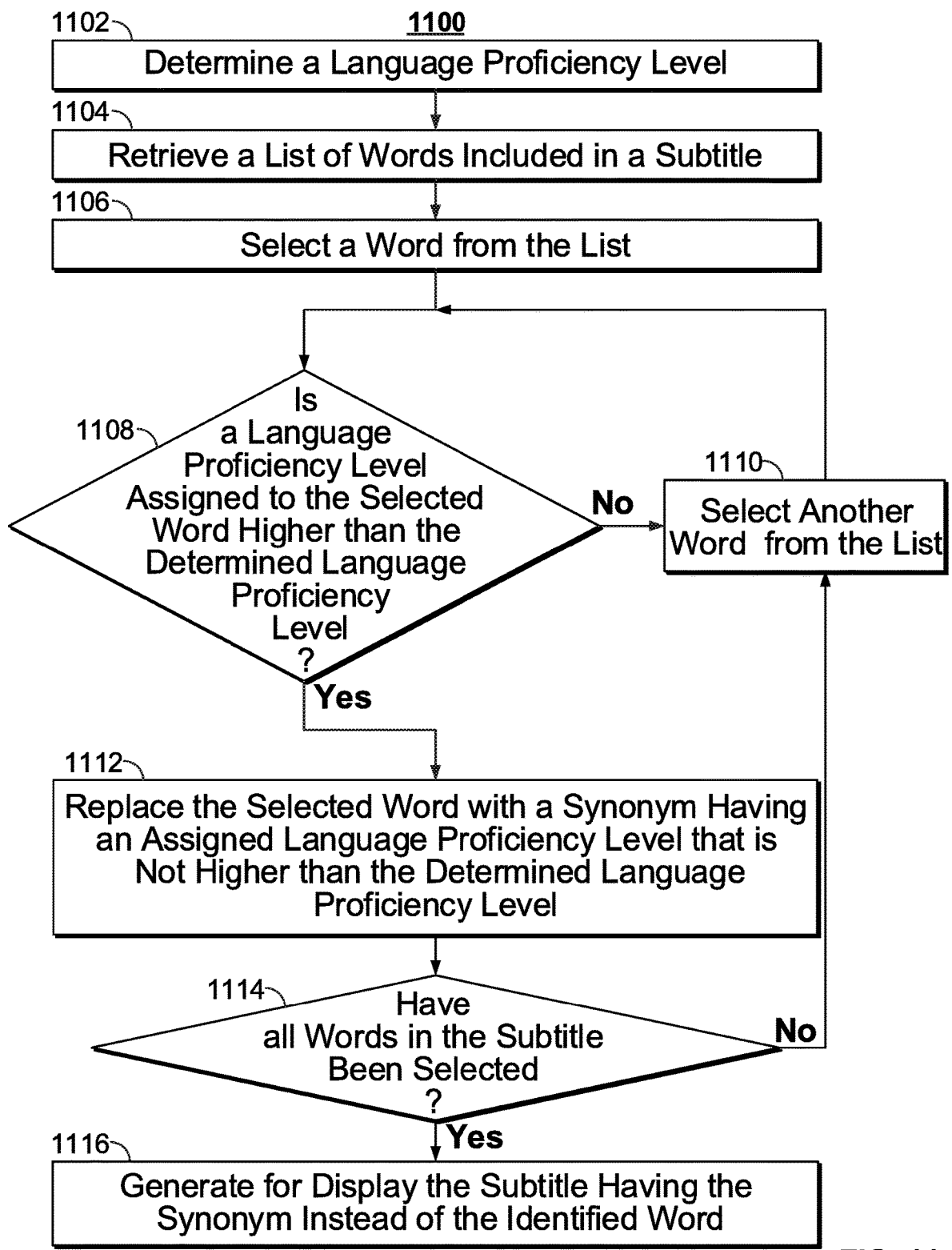
FIG. 11 is a flowchart of an illustrative process for modifying a subtitle based on a user's language proficiency, in accordance with some embodiments of the disclosure.

FIG. 11 is a flowchart of an illustrative process for modifying a subtitle based on a user's language proficiency, in accordance with some embodiments of the disclosure. A process 1100 for modifying a subtitle based on a user's language proficiency may begin at block 1102, where the control circuitry 304 determines a language proficiency level. For example, the control circuitry 304 may determine the language proficiency level based on a profile associated with a user (as described with reference to FIG. 6 above) and/or by generating a prompt requesting input from the user.

At block 1104, the control circuitry 304 retrieves a list of words included in a subtitle. For example, the control circuitry 304 may query the database 212 for a list of words included in the subtitle.

At block 1106, the control circuitry 304 selects a word from the list of words included in the subtitle. For example, the control circuitry 304 may select a first word in the list or may order the list in alphabetical (or some other predetermined) order and then select the first word in the list.

At block 1108, the control circuitry 304 determines whether a language proficiency level assigned to the word selected at block 1106 is higher than the language proficiency level determined at block 1102. For example, the control circuitry 304 may compare the language proficiency level assigned to the selected word with the determined language proficiency level to determine which is higher. In response to determining that the language proficiency level assigned to the selected word is not higher than the determined language proficiency level, the process 1100 proceeds to block 1110. In response to determining that the language proficiency level assigned to the selected word is higher than the determined language proficiency level, the process 1100 proceeds to block 1112.

At block 1110, the control circuitry selects another word from the list. For example, the control circuitry 304 may select the next word from the list in the same order as selecting the previous word from the list at block 1106.

At block 1112, the control circuitry replaces the selected word with a synonym having an assigned language proficiency level that is not higher than the determined language proficiency level. For example, the control circuitry 304 may query the database 212 for a synonym to the selected word that has an assigned language proficiency level that is not higher than the determined language proficiency level. The control circuitry 304 may then replace the identified word with the synonym. While described here as word-level replacement, those skilled in the art will recognize that the same or similar techniques as described here may also be used to perform phrase or full sentence replacement.

At block 1114, the control circuitry 304 determines whether all of the words in the subtitle have been selected. For example, the control circuitry 304 may determine whether each of the words in the list has been selected. In response to determining that all of the words in the subtitle have not been selected, the process 1100 returns to block 1110. In response to determining that all of the words in the subtitle have been selected, the process 1100 proceeds to block 1116.

At block 1116, the control circuitry 304 generates for display the subtitle having the synonym instead of the identified word. For example, the control circuitry 304 may match timing information included in metadata associated with the subtitle to timing information of the media asset 108 and cause the media device 102 to display the subtitle 106 with timing information matching a current play position of the media asset 108. In some embodiments, the control circuitry 304 generates for display the subtitle having the synonym instead of the identified word by slowing a frame rate at which the media asset is being output, thereby allowing the user more time to read the subtitle. The control circuitry 304 may further split the subtitle into multiple parts. For example, a subtitle that may have been generated as a single subtitle may be split into multiple parts to be displayed consecutively. The control circuitry 304 may also adjust or extend the amount of time that the subtitle is displayed depending on a complexity of the subtitle. The control circuitry 304 may determine the complexity of the subtitle based on the number of words included in the subtitle that have an assigned language proficiency level above a predetermined level. For example, the control circuitry 304 may determine that a subtitle that includes more than 3 words that have an assigned language proficiency level of fluent is a highly complex subtitle, and accordingly extend the duration for which that subtitle is displayed.

Figure 12:
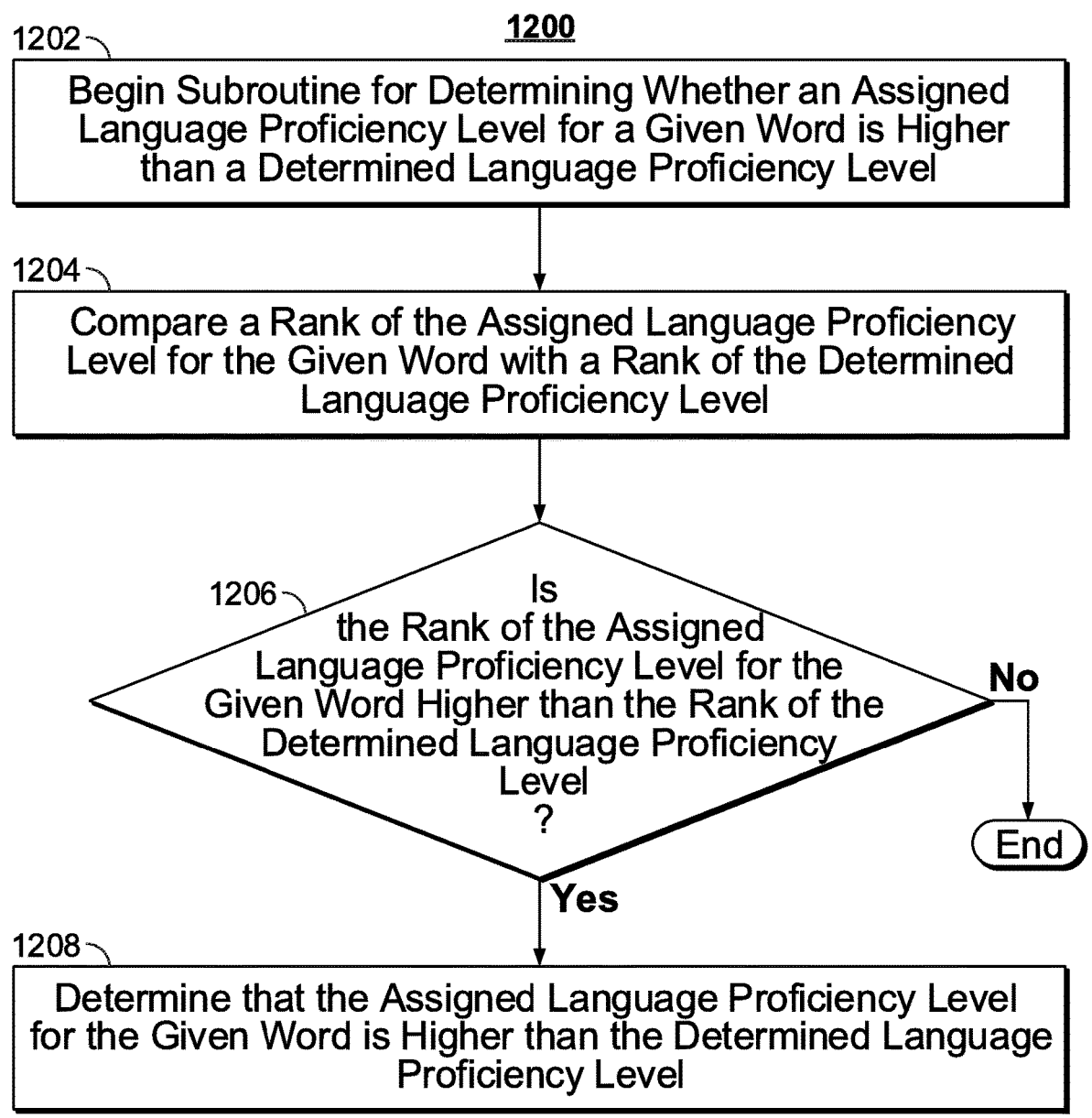
FIG. 12 is a flowchart of a detailed illustrative process for determining whether an assigned language proficiency level for a given word is higher than a determined language proficiency level, in accordance with some embodiments of the disclosure.

FIG. 12 is a flowchart of a detailed illustrative process for determining whether an assigned language proficiency level for a given word is higher than a determined language proficiency level, in accordance with some embodiments of the disclosure. A process 1200 for determining whether an assigned language proficiency level for a given word is higher than a determined language proficiency level may begin at block 1202. At block 1204, the control circuitry 304 compares a rank of the language proficiency level assigned to a given word with a rank of the language proficiency level determined at block 1102. For example, the ranks may be beginner, intermediate, and fluent, and the control circuitry 304 may compare the ranks of the language proficiency level assigned to the given word with the determined language proficiency level. Alternatively, the ranks may be numerical. For example, the beginner level may be ranked 1, the intermediate level may be ranked 2, and the fluent level may be ranked 3. The control circuitry 304 may then compare the numerical ranks. Those skilled in the art will recognize that the ranks described here are merely as an example, and that any other ranks, whether numerical, symbolic, or otherwise, may be substituted for these ranks without departing from the scope of the present disclosure.

At block 1206, the control circuitry 304 determines whether the rank of the language proficiency level assigned to the given word is higher than the rank of the determined language proficiency level. For example, the control circuitry 304 may compare the symbolic or numerical ranks described above with reference to block 1204 to determine which is higher. In response to determining that the rank of the language proficiency level assigned to the given word is not higher than the rank of the determined language proficiency level, the process 1200 ends. In response to determining that the rank of the language proficiency level assigned to the given word is higher than the rank of the determined language proficiency level, the process 1200 proceeds to block 1208.

At block 1208, the control circuitry 304 determines that the language proficiency level assigned to the given word is higher than the determined language proficiency level.

Figure 13:
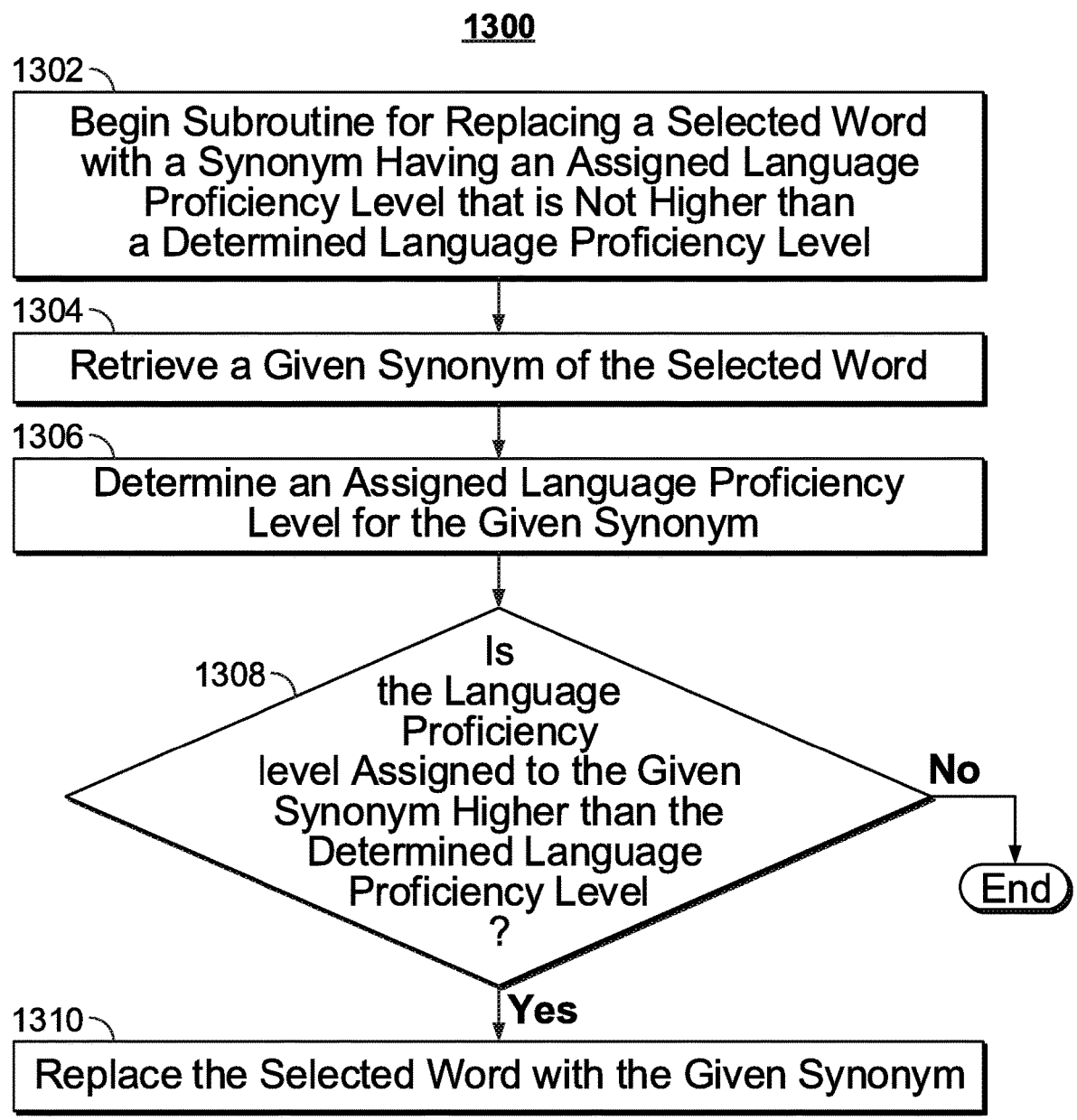
FIG. 13 is a flowchart of a detailed illustrative process for replacing an identified word with a synonym having an assigned language proficiency level that is not higher than a determined language proficiency level, in accordance with some embodiments of the disclosure.

FIG. 13 is a flowchart of a detailed illustrative process for replacing a selected word with a synonym having an assigned language proficiency level that is not higher than a determined language proficiency level, in accordance with some embodiments of the disclosure. A process 1300 for replacing a selected word with a synonym having an assigned language proficiency level that is not higher than a determined language proficiency level may begin at block

1302. At block 1304, the control circuitry 304 retrieves a given synonym of the word selected at block 1106. For example, the control circuitry 304 may retrieve, from the database 212 or from the list of synonyms retrieved at block 904, a given synonym of the selected word.

At block 1306, the control circuitry 304 determines a language proficiency level assigned to the given synonym retrieved at block 1304. For example, the control circuitry 304 may query the database 212 or another data source for the language proficiency level assigned to the given synonym.

At block 1308, the control circuitry 304 determines whether the language proficiency level assigned to the given synonym is higher than the language proficiency level determined at block 1102. For example, the control circuitry 304 may compare the language proficiency level assigned to the given synonym with the determined language proficiency level to determine which is higher. In response to determining that the language proficiency level assigned to the given synonym is higher than the determined language proficiency level, the process 1300 proceeds to block 1310. In response to determining that the language proficiency level assigned to the given synonym is not higher than the determined language proficiency level, the process 1300 ends.

At block 1310, the control circuitry 304 replaces the selected word with the given synonym. In some embodiments, the control circuitry 304 simply substitutes the given synonym for the selected word. In other embodiments, the control circuitry 304 further determines, based on metadata and/or a language syntax engine, whether it is grammatically correct to substitute the given synonym for the selected word. For example, a language syntax engine may indicate whether grammatical and/or syntactical modifications also need to be made to the subtitle in order to substitute the given synonym for the selected word. The control circuitry 304 may then substitute the given synonym for the selected word and make such other changes to the subtitle as indicated by the language syntax engine.

Figure 14:
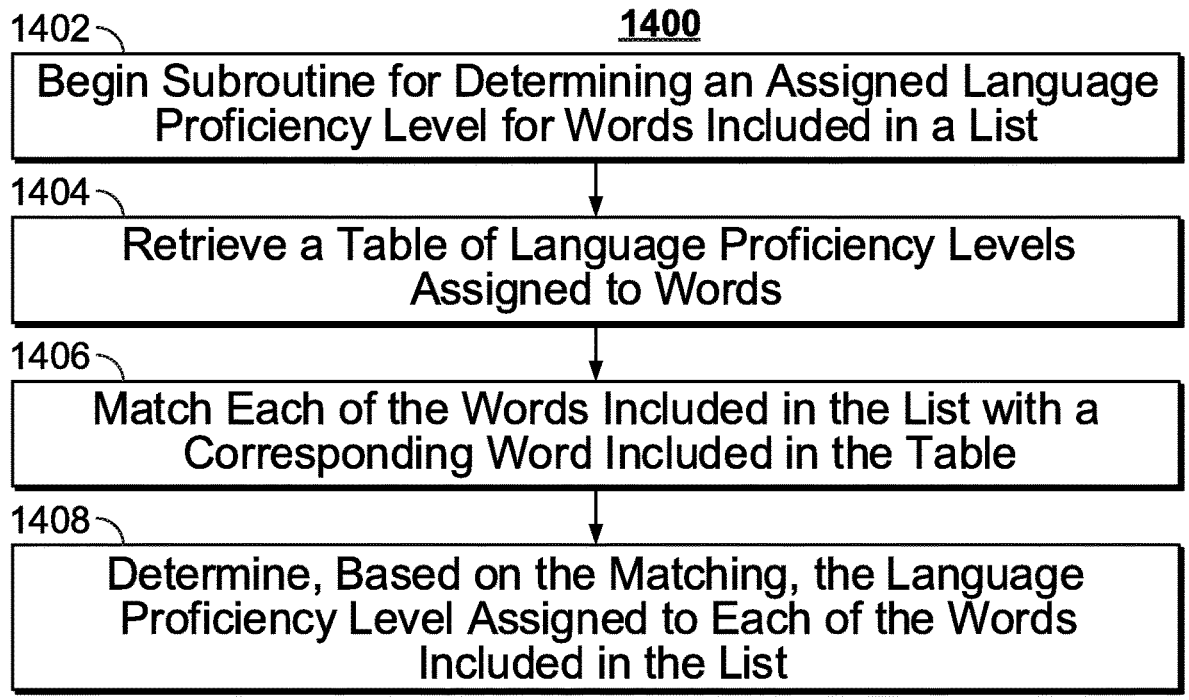
FIG. 14 is a flowchart of a detailed illustrative process for determining an assigned language proficiency level for words included in a list, in accordance with some embodiments of the disclosure.

FIG. 14 is a flowchart of a detailed illustrative process for determining an assigned language proficiency level for words included in a list, in accordance with some embodiments of the disclosure. A process 1400 for determining an assigned language proficiency level for words included in a list may begin at block 1402. At block 1404, the control circuitry 304 retrieves a table of language proficiency levels assigned to words. For example, the control circuitry 304 may query the database 212 for the database table 214.

At block 1406, the control circuitry 304 matches each of the words included in the list retrieved at block 1104 with a corresponding word included in the table. For example, the control circuitry 304 may query the database 212 for each word included in the list to retrieve an entry for the corresponding word in the database table 214.

At block 1408, the control circuitry 304 determines, based on the matching, the language proficiency level assigned to each of the words included in the list. For example, the control circuitry 304 may retrieve the language proficiency level assigned to each of the words from the database table 214 entry for the corresponding word, as retrieved at block 1404.

Figure 15:
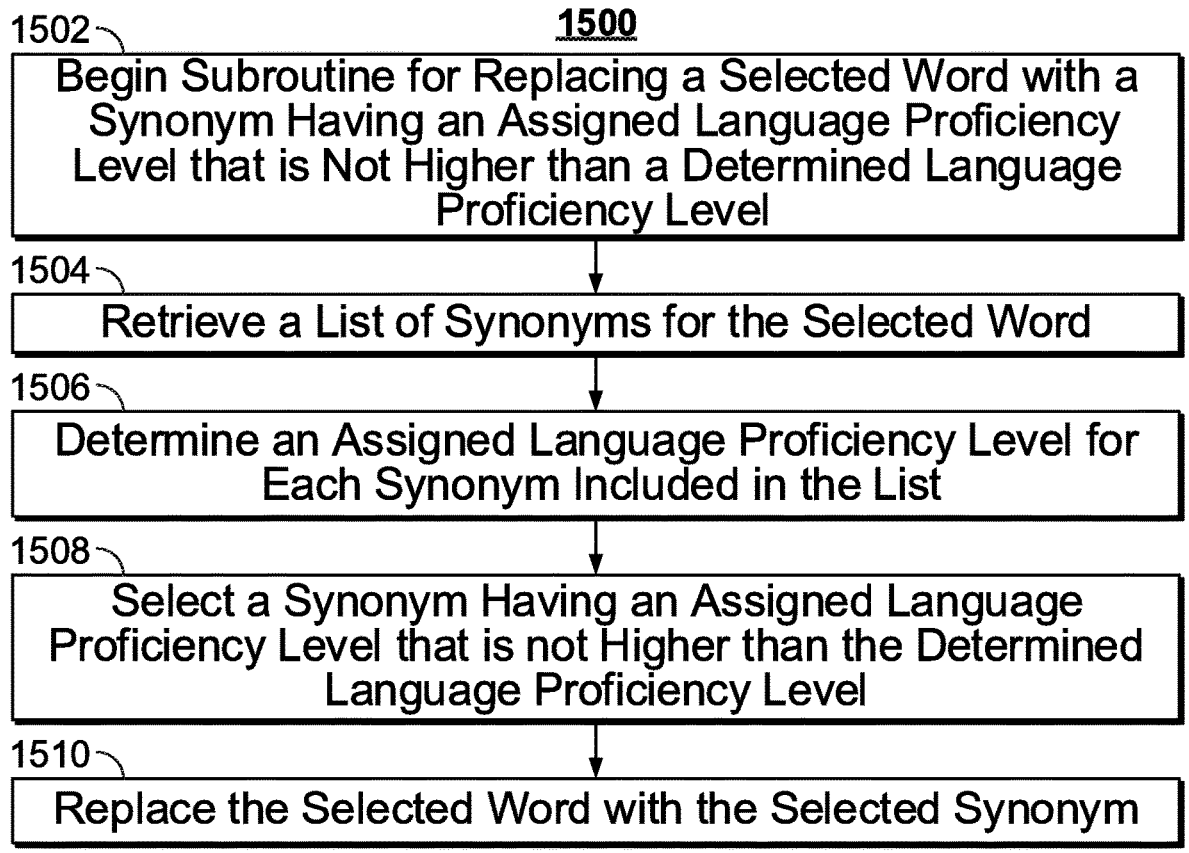
FIG. 15 is a flowchart of a detailed illustrative process for replacing an identified word with a synonym having an assigned language proficiency level that is not higher than a determined language proficiency level, in accordance with some embodiments of the disclosure.

FIG. 15 is a flowchart of a detailed illustrative process for replacing a selected word with a synonym having an assigned language proficiency level that is not higher than a determined language proficiency level, in accordance with some embodiments of the disclosure. A process 1500 for replacing the word selected at block 1106 with a synonym having an assigned language proficiency level that is not higher than the language proficiency level determined at block 1102 may begin at block 1502. At block 1504, the control circuitry 304 retrieves a list of synonyms for the selected word. For example, the control circuitry 304 may query the database 212 or an external source (such as a thesaurus) for a list of synonyms of the selected word.

At block 1506, the control circuitry 304 determines a language proficiency level assigned to each synonym included in the list retrieved at block 1504. For example, the control circuitry 304 may identify, based on metadata or by querying the database 212, the language proficiency level assigned to each synonym.

At block 1508, the control circuitry 304 selects, from the list of synonyms, a synonym having an assigned language proficiency level that is not higher than the language proficiency level determined at block 1102. For example, the control circuitry 304 may compare the language proficiency level assigned to each synonym with the determined language proficiency level to determine which synonyms have an assigned language proficiency that is not higher than the determined language proficiency level. Alternatively, the control circuitry 304 may query the database 212 for a synonym, from the list of synonyms, having an assigned language proficiency level that is not higher than the determined language proficiency level. In some embodiments, the control circuitry 304 removes adverbs and/or adjectives in the subtitle. For example, when selecting the synonym having the assigned language proficiency level that is not higher than the language proficiency level determined at block 1102, the control circuitry 304 may select a synonym without adverbs and/or adjectives. In some embodiments, the control circuitry 304 may replaces nouns with pronouns. For example, when selecting the synonym having the assigned language proficiency level that is not higher than the language proficiency level determined at block 1102, the control circuitry 304 may select a pronoun to replace a noun.

At block 1510, the control circuitry 304 replaces the selected word with the selected synonym. In some embodiments, the control circuitry 304 simply substitutes the selected synonym for the selected word. In other embodiments, the control circuitry 304 further determines, based on metadata and/or a language syntax engine, whether it is grammatically correct to substitute the selected synonym for the selected word. For example, a language syntax engine may indicate whether grammatical and/or syntactical modifications also need to be made to the subtitle in order to substitute the selected synonym for the selected word. The control circuitry 304 may then substitute the selected synonym for the selected word and make such other changes to the subtitle as indicated by the language syntax engine.

Figure 16:
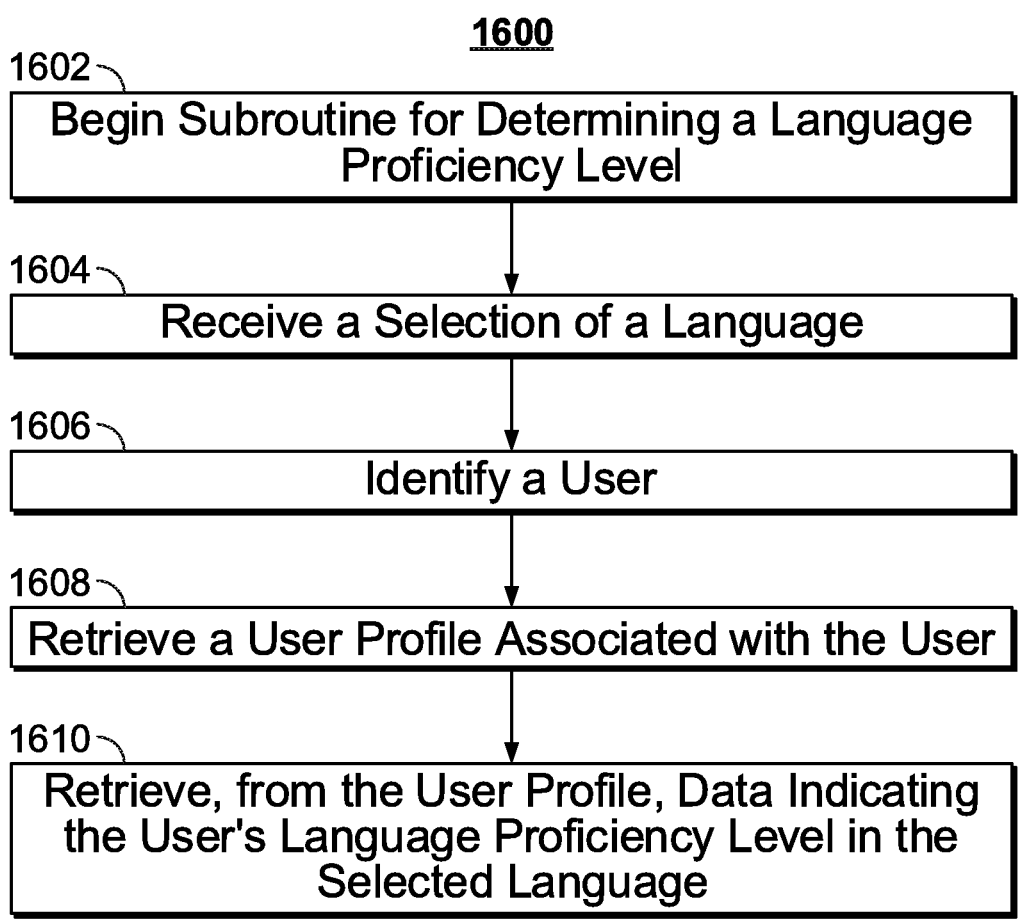
FIG. 16 is a flowchart of a detailed illustrative process for determining a language proficiency level, in accordance with some embodiments of the disclosure.

FIG. 16 is a flowchart of a detailed illustrative process for determining a language proficiency level, in accordance with some embodiments of the disclosure. A process 1600 for determining a language proficiency level may begin at block 1602. At block 1604, the control circuitry 304 receives a selection of a language 110. In some embodiments, as shown in FIG. 1, the user may provide a request 104 which includes a specification of a language 110, and the control circuitry 304 may process the received request 104 to identify the selection of the language 110. In other embodiments, the control circuitry 304 may determine the language 110 based on a profile associated with the user. The control circuitry 304 may retrieve, from the profile associated with the user, language preferences of the user. The control circuitry 304 may then determine in which of the user's preferred languages subtitles 106 are available and may select the language 110 for the subtitles 106 based on the user's language preferences and the availability of subtitles 106 in those languages.

At block 1606, the control circuitry 304 identifies the user. The control circuitry 304 may identify the user based on the request 104. For example, the control circuitry 304 may identify the user by matching the sound of the user's voice (as received in the request 104) to a voice profile associated with the user. Additionally or alternatively, the control circuitry 304 may receive an image of the user captured via a camera associated with the media device 102 and may identify the user based on the image. The control circuitry 304 may further identify the user based on an association of the media device 102 to the user, and/or based on an account or profile used to access the media device 102.

At block 1608, the control circuitry 304 retrieves a profile associated with the user. For example, the control circuitry 304 may retrieve, from the storage 308 of the media device 102 and/or from the content source 210, a profile associated with the identity of the user as determined at block 1606.

At block 1610, the control circuitry 304 retrieves, from the profile, data indicating the user's proficiency in the language 110 selected at block 1604. For example, the control circuitry 304 may retrieve, from the profile, data indicating that the user is fluent in Italian, moderately proficient in French and Spanish, and has only a beginner-level proficiency in English. In some embodiments, the data indicating the user's proficiency in the language 110 includes data indicating the user's reading speed in the language 110. For example, the control circuitry 304 may retrieve the data indicating the user's reading speed in the language 110 from the profile. In some embodiments, the profile and/or the data indicating the user's reading speed in the language 110 are stored on a separate device, such as an Internet-of-Things (IoT) device. In such embodiments, the control circuitry 304 may retrieve the profile and/or the data indicating the user's reading speed in the language 110 from the IoT device.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for providing subtitles based on a user's language proficiency, the method comprising:
   receiving a request to display subtitles;
   selecting a language for the subtitles;
   determining, from a user profile, a user's proficiency level in the selected language;
   selecting, based on the user's proficiency level in the selected language, a set of subtitles from a plurality of sets of subtitles in the selected language, wherein each respective set of subtitles corresponds to a different proficiency level in the selected language; and
   generating for display the selected set of subtitles.

2. The method of claim 1, wherein determining the user's proficiency level in the selected language comprises:
   identifying the user;
   retrieving the user profile associated with the user; and
   retrieving, from the user profile, data indicating the user's reading speed in the selected language.

3. A system for providing subtitles based on a user's language proficiency, the system comprising:
   input circuitry configured to receive a request to display subtitles; and
   control circuitry configured to:
      select a language for the subtitles;
      determine, from a user profile, a user's proficiency level in the selected language;
      select, based on the user's proficiency level in the selected language, a set of subtitles from a plurality of sets of subtitles in the selected language, wherein each respective set of subtitles corresponds to a different proficiency level in the selected language; and
      generate for display the selected set of subtitles.

4. The system of claim 3, wherein the control circuitry is further configured to determine the user's proficiency level in the selected language by:
   identifying the user;
   retrieving the user profile associated with the user; and
   retrieving, from the user profile, data indicating the user's reading speed in the selected language.

5. A method for modifying a subtitle based on a user's language proficiency, the method comprising:
   determining, using control circuitry, from an electronically stored user profile, a language proficiency level;
   identifying, using the control circuitry, a word in a subtitle having an assigned language proficiency level higher than the determined language proficiency level;
   replacing the identified word with a synonym having an assigned language proficiency level that is not higher than the determined language proficiency level; and
   generating for display the subtitle having the synonym instead of the identified word.

6. The method of claim 5, wherein identifying the word in the subtitle having the assigned language proficiency level higher than the determined language proficiency level comprises:
   determining, using the control circuitry, whether an assigned language proficiency level for a given word is higher than the determined language proficiency level; and
   in response to determining that the assigned language proficiency level for the given word is higher than the determined language proficiency level, selecting the given word as the word having the assigned language proficiency level higher than the determined language proficiency level.

7. The method of claim 5, wherein replacing the identified word with the synonym having the assigned language proficiency level that is not higher than the determined language proficiency level comprises:
 retrieving, from a database, a given synonym of the identified word;
 determining, using the control circuitry, an assigned language proficiency level for the given synonym;
 determining, using the control circuitry, whether the assigned language proficiency level for the given synonym is higher than the determined language proficiency level; and
 in response to determining that the assigned language proficiency level for the given synonym is not higher than the determined language proficiency level, replacing the identified word with the given synonym.

8. The method of claim 5, wherein replacing the identified word with the synonym having the assigned language proficiency level that is not higher than the determined language proficiency level comprises:
 retrieving, from a database, a list of synonyms for the identified word;
 determining, using the control circuitry, an assigned language proficiency level for each synonym included in the list of synonyms for the identified word;
 selecting, from the list of synonyms for the identified word, a synonym having an assigned language proficiency level that is not higher than the determined language proficiency level; and
 replacing the identified word with the selected synonym.

9. The method of claim 5, wherein generating for display the subtitle having the synonym instead of the identified word comprises one or more of:
 splitting the subtitle into a plurality of partial subtitles, and generating for display each of the plurality of partial subtitles consecutively; or
 adjusting a duration of time for which the subtitle is displayed.

10. The method of claim 6, further comprising:
 retrieving, from a database, a list of words included in the subtitle; and
 determining, using the control circuitry, an assigned language proficiency level for each of the words included in the list.

11. The method of claim 6, wherein determining whether the assigned language proficiency level for the given word is higher than the determined language proficiency level comprises:
 comparing, using the control circuitry, a rank of the assigned language proficiency level for the given word with a rank of the determined language proficiency level;
 determining, using the control circuitry, whether the rank of the assigned language proficiency level for the given word is higher than the rank of the determined language proficiency level; and
 in response to determining that the rank of the assigned language proficiency level for the given word is higher than the determined language proficiency level, determining that the assigned language proficiency level for the given word is higher than the determined language proficiency level.

12. The method of claim 10, wherein determining the assigned language proficiency level for each of the words included in the list comprises retrieving, from the database, the assigned language proficiency level for each of the words included in the list.

13. The method of claim 10, wherein determining the assigned language proficiency level for each of the words included in the list comprises:
 retrieving a table of language proficiency levels assigned to words;
 matching each of the words included in the list with a corresponding word included in the table; and
 determining, based on the matching, the language proficiency level assigned to each of the words included in the list.

14. The method of claim 8, wherein selecting a synonym having an assigned language proficiency level that is not higher than the determined language proficiency level comprises one or more of:
 selecting a synonym that excludes adverbs and adjectives; or
 selecting a pronoun to replace a noun.

15. A system for modifying a subtitle based on a user's language proficiency, the system comprising:
 control circuitry configured to:
  determine from an electronically stored user profile, a language proficiency level;
  identify a word in a subtitle having an assigned language proficiency level higher than the determined language proficiency level;
  replace the identified word with a synonym having an assigned language proficiency level that is not higher than the determined language proficiency level; and
  generate for display, on a display device, the subtitle having the synonym instead of the identified word.

16. The system of claim 15, wherein the control circuitry is further configured to identify the word in the subtitle having the assigned language proficiency level higher than the determined language proficiency level by:
 determining whether an assigned language proficiency level for a given word is higher than the determined language proficiency level; and
 in response to determining that the assigned language proficiency level for the given word is higher than the determined language proficiency level, selecting the given word as the word having the assigned language proficiency level higher than the determined language proficiency level.

17. The system of claim 15, wherein the control circuitry is further configured to replace the identified word with the synonym having the assigned language proficiency level that is not higher than the determined language proficiency level by:
 retrieving, from a database, a given synonym of the identified word;
 determining an assigned language proficiency level for the given synonym;
 determining whether the assigned language proficiency level for the given synonym is higher than the determined language proficiency level; and
 in response to determining that the assigned language proficiency level for the given synonym is not higher than the determined language proficiency level, replacing the identified word with the given synonym.

18. The system of claim 15, wherein the control circuitry is further configured to replace the identified word with the synonym having the assigned language proficiency level that is not higher than the determined language proficiency level by:
 retrieving, from a database, a list of synonyms for the identified word;

determining an assigned language proficiency level for each synonym included in the list of synonyms for the identified word;
selecting, from the list of synonyms for the identified word, a synonym having an assigned language proficiency level that is not higher than the determined language proficiency level; and
replacing the identified word with the selected synonym.

19. The system of claim 15, wherein the control circuitry is further configured to generate for display the subtitle having the synonym instead of the identified word by one or more of:
splitting the subtitle into a plurality of partial subtitles, and generating for display each of the plurality of partial subtitles consecutively; or
adjusting a duration of time for which the subtitle is displayed.

20. The system of claim 16, wherein the control circuitry is further configured to:
retrieve, from a database, a list of words included in the subtitle; and
determine an assigned language proficiency level for each of the words included in the list.

21. The system of claim 16, wherein the control circuitry is further configured to determine whether the assigned language proficiency level for the given word is higher than the determined language proficiency level by:
comparing a rank of the assigned language proficiency level for the given word with a rank of the determined language proficiency level;
determining whether the rank of the assigned language proficiency level for the given word is higher than the rank of the determined language proficiency level; and
in response to determining that the rank of the assigned language proficiency level for the given word is higher than the determined language proficiency level, determining that the assigned language proficiency level for the given word is higher than the determined language proficiency level.

22. The system of claim 20, wherein the control circuitry is further configured to determine the assigned language proficiency level for each of the words included in the list by retrieving, from the database, the assigned language proficiency level for each of the words included in the list.

23. The system of claim 20, wherein the control circuitry is further configured to determine the assigned language proficiency level for each of the words included in the list by:
retrieving a table of language proficiency levels assigned to words;
matching each of the words included in the list with a corresponding word included in the table; and
determining, based on the matching, the language proficiency level assigned to each of the words included in the list.

24. The system of claim 18, wherein the control circuitry is further configured to select a synonym having an assigned language proficiency level that is not higher than the determined language proficiency level by one or more of:
selecting a synonym that excludes adverbs and adjectives; or
selecting a pronoun to replace a noun.

* * * * *